United States Patent
Hara et al.

(10) Patent No.: US 8,334,676 B2
(45) Date of Patent: Dec. 18, 2012

(54) LITHIUM ION SECONDARY BATTERY, BATTERY PACK, HYBRID ELECTRIC VEHICLE, BATTERY PACK SYSTEM, AND CHARGE-DISCHARGE CONTROL METHOD

(75) Inventors: Tomitaro Hara, Okazaki (JP); Takeshi Abe, Okazaki (JP); Akira Tsujiko, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 372 days.

(21) Appl. No.: 12/674,014

(22) PCT Filed: Nov. 18, 2008

(86) PCT No.: PCT/JP2008/071278
§ 371 (c)(1),
(2), (4) Date: Feb. 18, 2010

(87) PCT Pub. No.: WO2009/066782
PCT Pub. Date: May 28, 2009

(65) Prior Publication Data
US 2011/0309798 A1     Dec. 22, 2011

(30) Foreign Application Priority Data
Nov. 21, 2007  (JP) .................. 2007-301848

(51) Int. Cl.
*H02J 7/00* (2006.01)
*H01M 10/00* (2006.01)
*H01M 2/26* (2006.01)

(52) U.S. Cl. ........ 320/134; 320/136; 320/106; 320/119; 429/158; 429/211

(58) Field of Classification Search .................... 320/134
See application file for complete search history.

(56) References Cited

U.S. PATENT DOCUMENTS

| | | | |
|---|---|---|---|
| 5,871,861 A * | 2/1999 | Hirokou et al. | 429/149 |
| 6,083,644 A * | 7/2000 | Watanabe et al. | 429/231.1 |
| 7,723,956 B2 * | 5/2010 | Tatebayashi et al. | 320/119 |
| 2007/0190404 A1 | 8/2007 | Hatanaka et al. | |

FOREIGN PATENT DOCUMENTS

| | | |
|---|---|---|
| CN | 101047263 | 10/2007 |
| EP | 1 841 003 A1 | 10/2007 |

(Continued)

OTHER PUBLICATIONS

K. Zaghib et al., "Optimized Electrochemical Performance of LiFePO$_4$ at 60°C with Purity Controlled by SQUID Magnetometry," Journal of Power Sources, vol. 163, pp. 560-566 (2006).

(Continued)

*Primary Examiner* — M'Baye Diao
(74) *Attorney, Agent, or Firm* — Finnegan, Henderson, Farabow, Garrett & Dunner, LLP

(57) ABSTRACT

A lithium ion secondary battery (100) has a property of securing a flat charge-discharge capacity range (FC) in which fluctuation of terminal voltage is 0.2 V or lower in both the cases where the battery is charged and discharged with electric current having a current value of 1 C over a capacity range of 50% or more of the electric capacity range having a theoretical electric capacity as an upper limit.

10 Claims, 13 Drawing Sheets

FOREIGN PATENT DOCUMENTS

| | | |
|---|---|---|
| JP | 9-171827 | 6/1997 |
| JP | 2003-59489 | 2/2003 |
| JP | 2003-100300 | 4/2003 |
| JP | 2005-135775 | 5/2005 |
| JP | 2005-158719 | 6/2005 |
| JP | 2005-285447 | 10/2005 |
| JP | 2005-336000 | 12/2005 |
| JP | 2007-273192 | 10/2007 |
| WO | WO 2006/050117 A | 5/2006 |
| WO | WO 2007/111988 A | 10/2007 |

OTHER PUBLICATIONS

Notification of the First Office Action for Chinese Appl. No. 200880103642.7 dated Jan. 29, 2012.

* cited by examiner

LITHIUM ION SECONDARY BATTERY, BATTERY PACK, HYBRID ELECTRIC VEHICLE, BATTERY PACK SYSTEM, AND CHARGE-DISCHARGE CONTROL METHOD

CROSS-REFERENCE TO RELATED APPLICATIONS

This application is a national phase application of International Application No. PCT/JP2008/071278, filed Nov. 18, 2008, and claims the priority of Japanese Application No. 2007-301848, filed Nov. 21, 2007, the contents of both of which are incorporated herein by reference.

TECHNICAL FIELD

The present invention relates to a lithium ion secondary battery, a battery pack using the lithium ion secondary batteries, a hybrid electric vehicle on which the battery pack is mounted, a battery pack system, and a method for controlling the charge-discharge of the battery pack.

BACKGROUND ART

A lithium ion secondary battery attracts attention as a power source of a portable device or a power source of an electric vehicle, a hybrid electric vehicle, or the like. A currently prevailing lithium ion secondary battery is one that has a positive active material comprising $LiMO_2$ (M represents Co, Ni, Mn, V, Al, Mg, or the like), a negative active material comprising graphite, and a nonaqueous electrolyte comprising Li salt and a nonaqueous solvent. Such a lithium ion secondary battery shows a high discharge voltage and has a high output as the advantages.

Such a lithium ion secondary battery is disclosed in, for example, JP2005-336000A, JP2003-100300A, and JP2003-59489A.

DISCLOSURE OF THE INVENTION

Problems to be Solved by the Invention

In the meantime, the lithium ion secondary batteries disclosed in the above patent applications are characterized in that the battery voltage increases gradually as electric charge advances during charging and inversely the battery voltage lowers gradually as electric discharge advances during discharging. A resultant problem has been that the fluctuation of voltage during charging and discharging is large (the fluctuation of the internal resistance in the battery is large) and hence the fluctuation of output is large, the output characteristic (IV characteristic) varies in accordance with a charging status (a remaining capacity) of the battery, and the battery is hardly usable.

The present invention has been established in view of the above situation and an object of the present invention is to provide a lithium ion secondary battery that has a small output fluctuation and can obtain a stable output characteristic (IV characteristic), a battery pack that uses the lithium ion secondary batteries, a hybrid electric vehicle on which the battery pack is mounted, a battery pack system that has a small output fluctuation and can obtain a stable output characteristic (IV characteristic), and a method for controlling the charging and discharging of the batteries.

Means for Solving the Problems

According to one aspect of the invention, there is provided a lithium ion secondary battery comprising: a positive electrode plate having a positive active material; a positive terminal electrically connected to the positive electrode plate; a negative electrode plate having a negative active material; and a negative terminal electrically connected to the negative electrode plate, wherein the lithium ion secondary battery has a property of being able to secure a flat charge-discharge capacity range defined as a capacity range that: accounts for 50% or more of an electric capacity range having, as an upper limit, a theoretical electric capacity that can be accumulated theoretically to the maximum in the positive active material; and corresponds to a range in which fluctuation of terminal voltage between the positive terminal and the negative terminal is 0.2 V or lower in both the cases where the battery is charged and discharged with electric current having a current value of 1 C at which the battery can be charged up to the theoretical electric capacity for one hour.

The lithium ion secondary battery according to the present invention has the property of being able to secure a flat charge-discharge capacity range. That is, the lithium ion secondary battery is characterized in that the battery can secure a capacity range in which the fluctuation of terminal voltage is 0.2 V or lower in both the cases where the battery is charged and discharged with electric current having a current value of 1 C over the capacity range of 50% or more of the theoretical electric capacity (for example, a capacity range corresponding to the range of 20% to 80% of the theoretical electric capacity). Consequently, by using the lithium ion secondary battery according to the present invention and charging and discharging the battery, it is possible to charge and discharge the battery while the voltage fluctuation is reduced (while the fluctuation of the internal resistance in the battery is reduced) at least in the flat charge-discharge capacity range. Thereby it is possible to obtain a stable output characteristic (IV characteristic) of a small output fluctuation.

In the above lithium ion secondary battery, preferably, the positive active material is $LiFe_{(1-X)}M_XPO_4$, wherein M represents at least one of Mn, Cr, Co, Cu, Ni, V, Mo, Ti, Zn, Al, Ga, Mg, B, and Nb, and X is determined by an expression: $0 \leq X \leq 0.5$.

A chemical compound expressed with $LiFe_{(1-X)}M_XPO_4$ has a property of being able to implant and eject Li ions in an amount corresponding to about 80% of the theoretical electric capacity at a charge-discharge potential in the vicinity of 3.4 V (Li standard). Consequently, by using $LiFe_{(1-X)}M_XPO_4$ as a positive active material, it is possible to obtain a lithium ion secondary battery characterized by being able to secure a flat charge-discharge capacity range over a wide electric capacity range (for example, 80% or more of the theoretical electric capacity).

In the above lithium ion secondary battery, preferably, the negative active material is a carbonaceous material.

The carbonaceous material has a property of being able to implant and eject Li ions in an amount corresponding to about 100% of the theoretical electric capacity at a charge-discharge potential in the vicinity of 0.05 V (Li standard). The lithium ion secondary battery according to the present invention uses $LiFe_{(1-X)}M_XPO_4$ as the positive active material and a carbonaceous material as the negative active material and hence it is possible to charge and discharge the battery with an electric quantity corresponding to about 80% of the theoretical electric capacity at a battery voltage in the vicinity of 3.35 V (=3.4−0.05). As a result, it is possible to: charge and discharge the battery at a relatively high battery voltage of about 3.35 V over a capacity range of about 80% of the theoretical electric capacity; and hence obtain a high output stably.

Here, as the carbonaceous materials, a natural graphite material, an artificial graphite material (mesocarbon microbead or the like), a non-graphitizable carbon material, and others are exemplified. In the materials, each of the natural graphite material and the artificial graphite material has a smaller crystal interlayer distance d and a larger crystal size Lc than the non-graphitizable carbon material and hence the fluctuation of charge-discharge potential reduces. Consequently, it is preferable to use at least either of the natural graphite material or the artificial graphite material (mesocarbon microbead or the like) as the negative active material.

Alternatively, in the above lithium ion secondary battery, preferably, the negative active material is a $Li_4Ti_5O_{12}$ type material.

The $Li_4Ti_5O_{12}$ type material has a property of being able to implant and eject Li ions in an amount corresponding to about 100% of the theoretical electric capacity at a charge-discharge potential in the vicinity of 1.5 V (Li standard). The lithium ion secondary battery according to the present invention uses $LiFe_{(1-X)}M_XPO_4$ as the positive active material and a $Li_4Ti_5O_{12}$ type material as the negative active material and hence it is possible to charge and discharge the battery with an electric quantity corresponding to about 80% of the theoretical electric capacity at a battery voltage in the vicinity of 1.9 V (=3.4−1.5). When $LiFe_{(1-X)}M_XPO_4$ is used as the positive active material in particular, the voltage fluctuation during charging and discharging can be reduced more in the case where the $Li_4Ti_5O_{12}$ type material is used than in the case where the carbonaceous material is used as the negative active material. As a result, the lithium ion secondary battery according to the present invention can obtain a more stable output characteristic (IV characteristic) of a smaller output fluctuation.

According to another aspect, the invention provides a battery pack comprising a plurality of the lithium ion secondary batteries according to one of the above configurations, the batteries being connected electrically in series to each other.

The battery pack according to the present invention is formed by electrically connecting in series plural lithium ion secondary batteries having the property of being able to secure the aforementioned flat charge-discharge capacity range. Consequently, when a battery pack according to the present invention is used and the lithium ion secondary batteries constituting the battery pack are charged and discharged, it is possible to charge and discharge the battery pack while the voltage fluctuation is reduced (while the fluctuation of the internal resistance in the batteries is reduced) at least in the flat charge-discharge capacity range. As a result, it is possible to obtain a stable output characteristic (IV characteristic) having a small output fluctuation.

According to another aspect, the invention provides a hybrid electric vehicle mounting thereon a battery pack as a driving power source, the battery pack comprising a plurality of lithium ion secondary batteries connected electrically in series to each other, wherein the lithium ion secondary battery comprises: a positive electrode plate having a positive active material; a positive terminal electrically connected to the positive electrode plate; a negative electrode plate having a negative active material; and a negative terminal electrically connected to the negative electrode plate, wherein the lithium ion secondary battery has a property of being able to secure a flat charge-discharge capacity range defined as a capacity range that: accounts for 50% or more of an electric capacity range having, as an upper limit, a theoretical electric capacity that can be accumulated theoretically to the maximum in the positive active material; and corresponds to a range in which fluctuation of terminal voltage between the positive terminal and the negative terminal is 0.2 V or lower in both the cases where the battery is charged and discharged with electric current having a current value of 1 C at which the battery can be charged up to the theoretical electric capacity for one hour.

The hybrid electric vehicle according to the present invention uses the lithium ion secondary batteries each having a property of being able to be charged and discharged with an electric quantity of not less than 50% of the theoretical electric capacity at a current value of 1 C and the fluctuation width of the terminal voltage of 0.2 V or lower in the maximum flat charge-discharge capacity range as the lithium ion secondary batteries constituting a battery pack mounted on the vehicle as the drive power source. Consequently, when the lithium ion secondary batteries constituting the battery pack are charged and discharged, it is possible to charge and discharge the battery pack while the voltage fluctuation is reduced (while the fluctuation of the internal resistance in the batteries is reduced) at least in the flat charge-discharge capacity range. As a result, it is possible to obtain a stable output having a small output fluctuation from the battery pack and hence it is possible to exhibit a stable driving force.

In the hybrid electric vehicle, preferably, the positive active material of the lithium ion secondary battery is $LiFe_{(1-X)}M_XPO_4$, wherein M represents at least one of Mn, Cr, Co, Cu, Ni, V, Mo, Ti, Zn, Al, Ga, Mg, B, and Nb, and X is determined by an expression: $0 \leq X \leq 0.5$.

As stated above, the lithium ion secondary battery using $LiFe_{(1-X)}M_XPO_4$ as the positive active material can secure a wider flat charge-discharge capacity range. Consequently, the battery pack formed by combining such lithium ion secondary batteries can charge and discharge each of the lithium ion secondary batteries while the voltage fluctuation is reduced (while the fluctuation of the internal resistance in the batteries is reduced) over a wide capacity range. As a result, a hybrid electric vehicle according to the present invention can obtain a more stable output having a smaller output fluctuation from the battery pack and hence can exhibit a more stable driving force.

In the hybrid electric vehicle, preferably, the negative active material of the lithium ion secondary battery is a carbonaceous material.

As stated above, the lithium ion secondary battery that uses $LiFe_{(1-X)}M_XPO_4$ as the positive active material and the carbonaceous material as the negative active material can be charged and discharged with an electric quantity corresponding to about 80% of the theoretical electric capacity at a battery voltage in the vicinity of 3.35 V. Consequently, the battery pack formed by combining such lithium ion secondary batteries can charge and discharge each of the lithium ion secondary batteries at a relatively high battery voltage of about 3.35 V over the capacity range of about 80% of the theoretical electric capacity. As a result, the hybrid electric vehicle according to the present invention can obtain a high output stably from the battery pack and hence can exhibit a large driving force stably.

Alternatively, in the hybrid electric vehicle, preferably, the negative active material of the lithium ion secondary battery is a $Li_4Ti_5O_{12}$ type material.

As stated above, when $LiFe_{(1-X)}M_XPO_4$ is used as the positive active material, the voltage fluctuation during charging and discharging can be reduced more in the case where the $Li_4Ti_5O_{12}$ type material is used than in the case where the carbonaceous material is used as the negative active material. Consequently, the battery pack formed by combining such lithium ion secondary batteries can obtain a more stable output characteristic (IV characteristic) of a small output fluctuation. As a result, the hybrid electric vehicle according to the present invention can exhibit a more stable driving force.

According to another aspect, the invention provides a battery pack system comprising: a battery pack comprising a plurality of lithium ion secondary batteries electrically connected in series to each other, each of the lithium ion secondary batteries including: a positive electrode plate having a positive active material; a positive terminal electrically connected to the positive electrode plate; a negative electrode plate having a negative active material; and a negative terminal electrically connected to the negative electrode plate, wherein the lithium ion secondary battery has a property of being able to secure a flat charge-discharge capacity range defined as a capacity range that: accounts for 50% or more of an electric capacity range having, as an upper limit, a theoretical electric capacity that can be accumulated theoretically to the maximum in the positive active material; and corresponds to a range in which fluctuation of terminal voltage between the positive terminal and the negative terminal is 0.2 V or lower in both the cases where the battery is charged and discharged with electric current having a current value of 1 C at which the battery can be charged up to the theoretical electric capacity for one hour, and charge-discharge control means for charging and discharging each of the lithium ion secondary batteries in a charge-discharge capacity range including at least a part of a maximum flat charge-discharge capacity range defined as a widest range of the flat charge-discharge capacity range of each lithium ion secondary battery.

The battery pack system according to the present invention is provided with: the battery pack formed by electrically connecting plural lithium ion secondary batteries to each other in series; and the charge-discharge control means to control the charging and discharging of the battery pack. Each of the lithium ion secondary batteries has the property of being able to secure a flat charge-discharge capacity range. In the battery pack system, each of the lithium ion secondary batteries constituting the battery pack is charged and discharged in a charge-discharge capacity range including at least a part of the maximum flat charge-discharge capacity range. This makes it possible to charge and discharge the battery pack while the voltage fluctuation in the battery pack is reduced (while the fluctuation of the internal resistance in each battery is reduced) when the battery pack is charged and discharged at least in the maximum flat charge-discharge capacity range and hence it is possible to obtain a stable output having a small output fluctuation.

In the above battery pack, preferably, a range of 80% or more of the charge-discharge capacity range belongs to the maximum flat charge-discharge capacity range.

In the battery pack system according to the present invention, a range of 80% or more of the charge-discharge capacity range belongs to the maximum flat charge-discharge capacity range and hence it is possible to charge and discharge the battery pack mostly in the maximum flat charge-discharge capacity range. As a result, it is possible to charge and discharge the battery pack while the voltage fluctuation in the battery pack is further reduced (while the fluctuation of the internal resistance in each battery is reduced) and hence it is possible to obtain a stable output having a small output fluctuation.

One of the above battery packs, preferably, further comprises: current detection means for detecting a value of current flowing in each of the lithium ion secondary batteries; electric quantity computation means for computing a charged electric quantity or a discharged electric quantity of each of the lithium ion secondary batteries by integrating the detected current value; and electric capacity estimation means for estimating an electric capacity stored in each lithium ion secondary battery in an electric capacity range including at least a part of the maximum flat charge-discharge capacity range based on the computed charged electric quantity or the computed discharged electric quantity.

The lithium ion secondary battery to be controlled in the battery pack system according to the present invention has the property of being able to secure a flat charge-discharge capacity range as stated above. Consequently, when the battery pack is charged and discharged in the flat charge-discharge capacity range, the terminal voltage scarcely fluctuates and hence it is difficult to compute a charged or discharged electric quantity with a high degree of accuracy by a method for computing the charged or discharged electric quantity of the battery based on the terminal voltage.

In contrast, in the case of the battery pack system according to the present invention, with regard to each lithium ion secondary battery having the above property, the charged or discharged electric quantity is computed by integrating the values of electric current flowing therein. By so doing, it is possible to compute the charged or discharged electric quantity with a high degree of accuracy even in the flat charge-discharge capacity range. Then an electric capacity stored in each lithium ion secondary battery is estimated based on the accurate charged or discharged electric quantity in an electric capacity range including at least a part of the maximum flat charge-discharge capacity range and hence it is possible to appropriately estimate the electric capacity of each lithium ion secondary battery.

In one of the above battery pack systems, preferably, the system further comprises voltage detection means for detecting the terminal voltage of one or more of the lithium ion secondary batteries, and the charge-discharge control means is arranged to control charging and discharging of each of the lithium ion secondary batteries based on the detected terminal voltage.

In the battery pack system according to the present invention, the charging and discharging of lithium ion secondary batteries are controlled based on a terminal voltage detected with the voltage detection means. As a result, the charge-discharge control of the lithium ion secondary batteries can be carried out more appropriately.

Here, the term "based on a terminal voltage detected" includes the cases of controlling the charging and discharging based on not only a measured value of detected terminal voltage but also an average of the measured values or the like. More specifically for example, there are the cases where control is carried out based on: an average of the terminal voltages of all the lithium ion secondary batteries constituting a battery pack; the terminal voltage of a representative lithium ion secondary battery singularly selected from among the lithium ion secondary batteries constituting a battery pack; the average of terminal voltages of the plural lithium ion secondary batteries plurally selected representatively from among the lithium ion secondary batteries constituting a battery pack; and the like.

As a control method to be executed by the charge-discharge control means according to the present invention, there is a method of charging a battery even after the electric capacity reaches the upper limit of the maximum flat charge-discharge capacity range and thereafter stopping the charging when the terminal voltage reaches a predetermined upper limit of the charging voltage. Further, there is another method of discharging a battery even after the electric capacity reaches the lower limit of the maximum flat charge-discharge capacity range and stopping the discharging when the terminal voltage reaches a predetermined lower limit of the discharging voltage.

In the above battery pack system, preferably, the charge-discharge control means includes charging stop means for stopping the charging of each of the lithium ion secondary batteries when the terminal voltage reaches a charging voltage upper limit.

In the battery pack system according to the present invention, the charging of lithium ion secondary batteries is stopped when the terminal voltage of the lithium ion secondary batteries reaches a predetermined upper limit of the charging voltage. Accordingly, it is possible to appropriately prevent over-charging caused by exceeding the upper limit of the charging voltage.

Here, as the "terminal voltage" used as the criterion for judging the stoppage of charging for example, there is: an average of the terminal voltages of all the lithium ion secondary batteries constituting the battery pack; the terminal voltage of a representative lithium ion secondary battery singularly selected from among the lithium ion secondary batteries constituting the battery pack; the average of terminal voltages of the plural lithium ion secondary batteries plurally selected from among the lithium ion secondary batteries constituting a battery pack; or the like.

In the above battery pack system, preferably, the positive active material of each of the lithium ion secondary batteries is $LiFe_{(1-x)}M_xPO_4$, wherein M represents at least one of Mn, Cr, Co, Cu, Ni, V, Mo, Ti, Zn, Al, Ga, Mg, B, and Nb, and X is determined by an expression: $0 \leq X \leq 0.5$, the negative active material is a carbonaceous material, and the charging voltage upper limit is set at a value of 3.60 V or higher and 4.05 V or lower.

In the battery pack system according to the present invention, the upper limit of the charging voltage of each of the lithium ion secondary batteries constituting the battery pack is set at 4.05 V or lower. It is accordingly possible to prevent the battery voltage from increasing in excess of 4.05 V and hence it is possible to inhibit the oxidative decomposition of an electrolyte. As a result, it is possible to improve the lifetime characteristic of the lithium ion secondary batteries constituting the battery pack.

Meanwhile, the lithium ion secondary battery to be controlled in the battery pack system according to the present invention is the lithium ion secondary battery having the positive active material comprising $LiFe_{(1-x)}M_xPO_4$ and the negative active material comprising the carbonaceous material. Such a lithium ion secondary battery has a maximum flat charge-discharge capacity range over the capacity range of about 15% to 95% of the theoretical electric capacity. Further, in the lithium ion secondary battery, the terminal voltage rises from about 3.2 V to about 3.4 V in the maximum flat charge-discharge capacity range when the battery is charged with an electric current of 1 C. Consequently, by setting the upper limit of the charging voltage at a value of 3.60 V or higher, it is possible to charge the battery with an electric quantity of not less than 95% of the theoretical electric capacity.

From the above results, in the battery pack system according to the present invention, it is possible to improve the lifetime characteristic of the lithium ion secondary battery constituting the battery pack while the battery can be charged with an electric quantity of not less than 95% of the theoretical electric capacity.

Alternatively, in the above battery pack system, preferably, the positive active material of each of the lithium ion secondary batteries is $LiFe_{(1-x)}M_xPO_4$, wherein M represents at least one of Mn, Cr, Co, Cu, Ni, V, Mo, Ti, Zn, Al, Ga, Mg, B, and Nb, and X is determined by an expression: $0 \leq X \leq 0.5$, the negative active material is a $Li_4Ti_5O_{12}$ type material, and the charging voltage upper limit is set at a value of 2.1 V or higher and 2.4 V or lower.

In the battery pack system according to the present invention, the upper limit of the charging voltage of each of the lithium ion secondary batteries constituting the battery pack is set at 2.4 V or lower. By setting the charging voltage at such a low value, it is possible to inhibit the oxidative decomposition of an electrolyte and hence it is possible to improve the lifetime characteristic of the lithium ion secondary batteries constituting the battery pack.

Meanwhile, the lithium ion secondary battery to be controlled in the battery pack system according to the present invention is the lithium ion secondary battery having the positive active material comprising $LiFe_{(1-x)}M_xPO_4$ and the negative active material comprising the $Li_4Ti_5O_{12}$ type material. Such a lithium ion secondary battery has a flat charge-discharge capacity range nearly at a constant terminal voltage of about 2 V over the capacity range of about 3% to 90% of the theoretical electric capacity. Consequently, by setting the upper limit of the charging voltage at a value of 2.1 V or higher, it is possible to charge the battery with an electric quantity of not less than 90% of the theoretical electric capacity.

From the above results, in the battery pack system according to the present invention, it is possible to improve the lifetime characteristic of a lithium ion secondary battery constituting the battery pack while the battery can be charged with an electric quantity of not less than 90% of the theoretical electric capacity.

One of the above battery pack systems, preferably, further comprises change rate computation means for computing a change rate of the terminal voltage per unit charged electric quantity or a change rate of the terminal voltage per unit time during at least charging of each of the lithium ion secondary batteries, wherein each lithium ion secondary battery has a property of increasing the change rate of the terminal voltage per unit charged electric quantity and the change rate of the terminal voltage per unit time as the electric capacity comes close to the theoretical electric capacity in an end stage of charging when each lithium ion secondary battery is charged until the electric capacity reaches the theoretical electric capacity, the charge-discharge control means comprises charging restriction means for restricting charging of each lithium ion secondary battery when: the change rate of the terminal voltage per unit charged electric quantity computed by the change rate computation means exceeds a first predetermined threshold larger than an average change rate of the terminal voltage per unit charged electric quantity in the maximum flat charge-discharge capacity range, or, the change rate of the terminal voltage per unit time computed by the change rate computation means exceeds a second predetermined threshold larger than an average change rate of the terminal voltage per unit time in the maximum flat charge-discharge capacity range.

When the change rate of the terminal voltage per unit charged electric quantity computed by the change rate computation means exceeds the first predetermined threshold that is larger than the average change rate of the terminal voltage per unit charged electric quantity in the maximum flat charge-discharge capacity range, it can be judged to be the end stage of charging. Further, when the change rate of the terminal voltage per unit time computed by the change rate computation means exceeds the second predetermined threshold that is larger than the average change rate of the terminal voltage per unit time in the maximum flat charge-discharge capacity range too, it can be judged to be the end stage of the charging. Consequently, by restricting the charging of the lithium ion secondary batteries constituting the battery pack when the change rate of the terminal voltage per unit charged electric quantity exceeds the first threshold or when the change rate of the terminal voltage per unit time exceeds the second threshold, it is possible to inhibit the battery voltage from sharply rising at the end stage of charging.

Here, as the "terminal voltage" constituting the change rate of the terminal voltage per unit charged electric quantity and the change rate of the terminal voltage per unit time computed by the change rate computation means for example, there is an average of terminal voltages of all the lithium ion secondary batteries constituting the battery pack (an average terminal voltage). Further, in addition, there is the terminal voltage of a representative lithium ion secondary battery singularly selected from among the lithium ion secondary batteries constituting the battery pack, the average of terminal voltages of the plural lithium ion secondary batteries plurally selected from among the lithium ion secondary batteries constituting a battery pack, or the like.

In the above battery pack system, preferably, the positive active material of each of the lithium ion secondary batteries is $LiFe_{(1-X)}M_XPO_4$, wherein M represents at least one of Mn, Cr, Co, Cu, Ni, V, Mo, Ti, Zn, Al, Ga, Mg, B, and Nb, and X is determined by an expression: $0 \leq X \leq 0.5$, the negative active material is a carbonaceous material, and the charging restriction means sets the first threshold or the second threshold at a value corresponding to the change rate of terminal voltage per an electric capacity corresponding to 1% of the theoretical electric capacity, the change rate falling within a range of $5.0 \times 10^{-3}$ V or more and $2.5 \times 10^{-1}$ V or less.

In the case of the lithium ion secondary battery having the positive active material comprising $LiFe_{(1-X)}M_XPO_4$ and the negative active material comprising the carbonaceous material, the average change rate of terminal voltage per a charged electric quantity corresponding to 1% of the theoretical electric capacity in the maximum flat charge-discharge capacity range takes a value of about $2.5 \times 10^{-3}$ (V) at the time of charging. Further, the terminal voltage is about 3.4 V at the upper limit of the maximum flat charge-discharge capacity range. Furthermore, when the electric capacity exceeds the upper limit of the maximum flat charge-discharge capacity range (about 95% of the theoretical electric capacity) and the end of charging comes, the change rate of the terminal voltage per a charged electric quantity corresponding to 1% of the theoretical electric capacity rises sharply and takes a value of about $5.0 \times 10^{-1}$ (V) at a terminal voltage in the vicinity of 4.05 V (the electric capacity is about 99% of the theoretical electric capacity).

Consequently, by setting the first or second threshold at a value corresponding to a value in the range of $5.0 \times 10^{-3}$ (V) to $2.5 \times 10^{-1}$ (V) as the change rate of the terminal voltage per an electric quantity corresponding to 1% of the theoretical electric capacity, it is possible to inhibit the battery voltage from rising sharply. This is because it may be judged that the battery voltage rises sharply thereafter when the change rate of the terminal voltage per unit charged electric quantity of the terminal voltage exceeds the first predetermined threshold or when the change rate of the terminal voltage per unit time of the terminal voltage exceeds the second predetermined threshold.

In the above battery pack system, preferably, the positive active material of each of the lithium ion secondary batteries is $LiFe_{(1-X)}M_XPO_4$, wherein M represents at least one of Mn, Cr, Co, Cu, Ni, V, Mo, Ti, Zn, Al, Ga, Mg, B, and Nb, and X is determined by an expression: $0 \leq X \leq 0.5$, the negative active material is a $Li_4Ti_5O_{12}$ type material, and the charging restriction means sets the first threshold or the second threshold at a value corresponding to the change rate of terminal voltage per an electric capacity corresponding to 1% of the theoretical electric capacity, the change rate falling within a range of $1.0 \times 10^{-3}$ V or more and $1.5 \times 10^{-1}$ V or less.

In the case of the lithium ion secondary battery having the positive active material comprising $LiFe_{(1-X)}M_XPO_4$ and the negative active material comprising the $Li_4Ti_5O_{12}$ type material, the average change rate of terminal voltage per a charged electric quantity corresponding to 1% of the theoretical electric capacity in the flat charge-discharge capacity range ranging from about 3% to about 90% of the theoretical electric capacity takes a value of about $6 \times 10^{-4}$ (V) at the time of charging. Further, the terminal voltage is about 2.05 V at the upper limit of the flat charge-discharge capacity range. Furthermore, when the electric capacity exceeds the upper limit of the flat charge-discharge capacity range (about 90% of the theoretical electric capacity) and the end of charging comes, the change rate of the terminal voltage per a charged electric quantity corresponding to 1% of the theoretical electric capacity rises sharply and takes a value of about $3.0 \times 10^{-1}$ (V) at a terminal voltage in the vicinity of 2.4 V (the electric capacity is about 99% of the theoretical electric capacity).

Consequently, by setting the first or second threshold at a value corresponding to a value in the range of $1.0 \times 10^{-3}$ (V) to $1.5 \times 10^{-1}$ (V) as the change rate of the terminal voltage per an electric quantity corresponding to 1% of the theoretical electric capacity, it is possible to inhibit the battery voltage from rising sharply. This is because it may be judged that the battery voltage rises sharply thereafter when the change rate of the terminal voltage per unit charged electric quantity exceeds the first predetermined threshold or when the change rate of the terminal voltage per unit time exceeds the second predetermined threshold.

According to another aspect, the invention provides a charge-discharge control method of controlling charging and discharging of a battery pack comprising: a plurality of lithium ion secondary batteries electrically connected in series to each other, each of the lithium ion secondary batteries including: a positive electrode plate having a positive active material; a positive terminal electrically connected to the positive electrode plate; a negative electrode plate having a negative active material; and a negative terminal electrically connected to the negative electrode plate, wherein the lithium ion secondary battery has a property of being able to secure a flat charge-discharge capacity range defined as a capacity range that: accounts for 50% or more of an electric capacity range having, as an upper limit, a theoretical electric capacity that can be accumulated theoretically to the maximum in the positive active material; and corresponds to a range in which fluctuation of terminal voltage between the positive terminal and the negative terminal is 0.2 V or lower in both the cases where the battery is charged and discharged with electric current having a current value of 1 C at which the battery can be charged up to the theoretical electric capacity for one hour, and wherein the method comprises a step of charging and discharging each of the lithium ion secondary batteries in a charge-discharge capacity range including at least a part of a maximum flat charge-discharge capacity range defined as a widest range of the flat charge-discharge capacity range of each lithium ion secondary battery.

The charge-discharge control method of the invention is achieved to control charging and discharging of the battery pack formed by electrically connecting plural lithium ion secondary batteries to each other in series. In this charge-discharge control method, each of the lithium ion secondary batteries constituting the battery pack is charged and discharged in a charge-discharge capacity range including at least a part of the maximum flat charge-discharge capacity range. This makes it possible to charge and discharge the battery pack while the voltage fluctuation in the battery pack is reduced (while the fluctuation of the internal resistance in each battery is reduced) when the battery pack is charged and discharged at least in the maximum flat charge-discharge capacity range and hence it is possible to obtain a stable output having a small output fluctuation.

In the above charge-discharge control method, preferably, each of the lithium ion secondary batteries is charged and discharged within the charge-discharge capacity range 80% or more of which belongs to the maximum flat charge-discharge capacity range.

In the charge-discharge control method of the present invention, a range of 80% or more of the charge-discharge capacity range belongs to the maximum flat charge-discharge capacity range and hence it is possible to charge and discharge the battery pack mostly in the maximum flat charge-discharge capacity range. As a result, it is possible to charge and discharge the battery pack while the voltage fluctuation in the battery pack is further reduced (while the fluctuation of the internal resistance in each battery is reduced) and hence it is possible to obtain a stable output having a small output fluctuation.

One of the above charge-discharge control methods, preferably, further comprises: a current detection step of detecting a value of current flowing in each of the lithium ion secondary batteries; an electric quantity computation step of computing a charged electric quantity or a discharged electric quantity of each of the lithium ion secondary batteries by integrating the detected current value; and an electric capacity estimation step of estimating electric capacity stored in each lithium ion secondary battery in an electric capacity range including at least a part of the maximum flat charge-discharge capacity range based on the computed charged electric quantity or the computed discharged electric quantity.

The lithium ion secondary battery to be controlled according to the present invention has the property of being able to secure a flat charge-discharge capacity range as stated above. Consequently, when the battery pack is charged and discharged in the flat charge-discharge capacity range, the terminal voltage scarcely fluctuates and hence it is difficult to compute a charged or discharged electric quantity with a high degree of accuracy by a method for computing the charged or discharged electric quantity of the battery based on the terminal voltage.

In contrast, in the case of the charge-discharge control method according to the present invention, with regard to each lithium ion secondary battery having the above property, the charged or discharged electric quantity is computed by detecting a value of electric current flowing in each lithium ion secondary battery and integrating the detected current values. By so doing, it is possible to compute the charged or discharged electric quantity with a high degree of accuracy even in the flat charge-discharge capacity range. Then an electric capacity stored in each lithium ion secondary battery is estimated based on the accurate charged or discharged electric quantity in an electric capacity range including at least a part of the maximum flat charge-discharge capacity range and hence it is possible to appropriately estimate the electric capacity of each lithium ion secondary battery.

In one of the above charge-discharge control methods, preferably, the method further comprises a voltage detection step of detecting the terminal voltage of one or more of the lithium ion secondary batteries, and a charge-discharge control step of controlling charging and discharging of each of the lithium ion secondary batteries based on the detected terminal voltage.

In the charge-discharge control method according to the present invention, the charging and discharging of lithium ion secondary batteries are controlled based on a detected terminal voltage. As a result, the charge-discharge control of the lithium ion secondary batteries can be carried out more appropriately.

Here, the term "based on a detected terminal voltage" includes the cases of controlling the charging and discharging based on not only a measured value of detected terminal voltage but also an average of the measured values or the like. More specifically for example, there are the cases where control is carried out based on: an average of the terminal voltages of all the lithium ion secondary batteries constituting a battery pack; the terminal voltage of a representative lithium ion secondary battery singularly selected from among the lithium ion secondary batteries constituting a battery pack; the average of terminal voltages of the plural lithium ion secondary batteries plurally selected representatively from among the lithium ion secondary batteries constituting a battery pack; and the like.

As a process in the charge-discharge control step according to the present invention, there is a process of charging a battery even after the electric capacity reaches the upper limit of the maximum flat charge-discharge capacity range and thereafter stopping the charging when the terminal voltage reaches a predetermined upper limit of the charging voltage. Further, there is another process of discharging a battery even after the electric capacity reaches the lower limit of the maximum flat charge-discharge capacity range and stopping the discharging when the terminal voltage reaches a predetermined lower limit of the discharging voltage.

In the above charge-discharge control method, preferably, the method further includes a charging stop step of stopping the charging of each of the lithium ion secondary batteries when the terminal voltage reaches a charging voltage upper limit.

In the charge-discharge control method according to the present invention, the charging of lithium ion secondary batteries is stopped when the terminal voltage of the lithium ion secondary batteries reaches a predetermined upper limit of the charging voltage. Accordingly, it is possible to appropriately prevent over-charging caused by exceeding the upper limit of the charging voltage.

Here, as the "terminal voltage" used as the criterion for judging the stoppage of charging for example, there is: an average of the terminal voltages of all the lithium ion secondary batteries constituting the battery pack; the terminal voltage of a representative lithium ion secondary battery singularly selected from among the lithium ion secondary batteries constituting the battery pack; the average of terminal voltages of the plural lithium ion secondary batteries plurally selected from among the lithium ion secondary batteries constituting a battery pack; or the like.

In the above charge-discharge control method, preferably, the positive active material of each of the lithium ion secondary batteries is $LiFe_{(1-X)}M_XPO_4$, wherein M represents at least one of Mn, Cr, Co, Cu, Ni; V, Mo, Ti, Zn, Al, Ga, Mg, B, and Nb, and X is determined by an expression: $0 \leqq X \leqq 0.5$, the negative active material is a carbonaceous material, and the charging voltage upper limit is set at a value of 3.60 V or higher and 4.05 V or lower.

In the charge-discharge control method according to the present invention, the upper limit of the charging voltage of each of the lithium ion secondary batteries constituting the battery pack is set at 4.05 V or lower. It is accordingly possible to prevent the battery voltage from increasing in excess of 4.05 V and hence it is possible to inhibit the oxidative decomposition of an electrolyte. As a result, it is possible to improve the lifetime characteristic of the lithium ion secondary batteries constituting the battery pack.

Meanwhile, the lithium ion secondary battery to be controlled by the charge-discharge control method according to the present invention is the lithium ion secondary battery having the positive active material comprising $LiFe_{(1-X)}M_XPO_4$ and the negative active material comprising the carbonaceous material. Such a lithium ion secondary battery has a maximum flat charge-discharge capacity range over the capacity range of about 15% to 95% of the theoretical electric capacity. Further, in the lithium ion secondary battery, the terminal voltage is an almost constant voltage of about 3.2 V to about 3.4 V in the flat charge-discharge capacity range when the battery is charged with an electric current of 1 C, whereas the terminal voltage sharply rises when the battery is charged beyond the flat charge-discharge capacity range. Consequently, by setting the upper limit of the charging voltage at a value of 3.60 V or higher and 4.05 V or lower, it is possible to charge the battery with an electric quantity of not less than 95% of the theoretical electric capacity while avoiding overcharging.

Alternatively, in the above charge-discharge control method, preferably, the positive active material of each of the lithium ion secondary batteries is $LiFe_{(1-X)}M_XPO_4$, wherein M represents at least one of Mn, Cr, CO, Cu, Ni, V, Mo, Ti, Zn, Al, Ga, Mg, B, and Nb, and X is determined by an expression: $0 \leq X \leq 0.5$, the negative active material is a $Li_4Ti_5O_{12}$ type material, and the charging voltage upper limit is set at a value of 2.1 V or higher and 2.4 V or lower.

In the charge-discharge control method according to the present invention, the upper limit of the charging voltage of each of the lithium ion secondary batteries constituting the battery pack is set at 2.4 V or lower. By setting the charging voltage at such a low value, it is possible to inhibit the oxidative decomposition of an electrolyte and hence it is possible to improve the lifetime characteristic of the lithium ion secondary batteries constituting the battery pack.

Meanwhile, the lithium ion secondary battery to be controlled by the charge-discharge control method according to the present invention is the lithium ion secondary battery having the positive active material comprising $LiFe_{(1-X)}M_XPO_4$ and the negative active material comprising the carbonaceous material. Such a lithium ion secondary battery has a maximum flat charge-discharge capacity range over the capacity range of about 3% to 90% of the theoretical electric capacity. Further, in the lithium ion secondary battery, the terminal voltage is an almost constant voltage of about 2 V in the flat charge-discharge capacity range when the battery is charged with an electric current of 1 C, whereas the terminal voltage sharply rises when the battery is charged beyond the flat charge-discharge capacity range. Consequently, by setting the upper limit of the charging voltage at a value of 2.1 V or higher and 2.4 V or lower, it is possible to charge the battery with an electric quantity of not less than 90% of the theoretical electric capacity while avoiding overcharging.

In one of the above charge-discharge control methods, preferably, each of the lithium ion secondary batteries has a property of increasing a change rate of the terminal voltage per unit charged electric quantity and a change rage of the terminal voltage per unit time as the electric capacity comes close to the theoretical electric capacity in an end stage of charging when each lithium ion secondary battery is charged until the electric capacity reaches the theoretical electric capacity, and the method further comprises: a change rate computation step of computing the change rate of the terminal voltage per unit charged electric quantity or the change rate of the terminal voltage per unit time during at least charging of each of the lithium ion secondary batteries; and a charging restriction step of restricting charging of each lithium ion secondary battery when: the change rate of the terminal voltage per unit charged electric quantity computed at the change rate computation step exceeds a first predetermined threshold larger than an average change rate of the terminal voltage per unit charged electric quantity in the maximum flat charge-discharge capacity range, or, the change rate of the terminal voltage per unit time computed at the change rate computation step exceeds a second predetermined threshold larger than an average change rate of the terminal voltage per unit time in the maximum flat charge-discharge capacity range.

When the change rate of the terminal voltage per unit charged electric quantity computed by the change rate computation means exceeds the first predetermined threshold that is larger than the average change rate of the terminal voltage per unit charged electric quantity in the maximum flat charge-discharge capacity range, it can be judged to be the end stage of charging. Further, when the change rate of the terminal voltage per unit time computed by the change rate computation means exceeds the second predetermined threshold that is larger than the average change rate of the terminal voltage per unit time in the maximum flat charge-discharge capacity range too, it can be judged to be the end stage of the charging. Consequently, by restricting the charging of the lithium ion secondary batteries constituting the battery pack when the change rate of the terminal voltage per unit charged electric quantity exceeds the first threshold or when the change rate of the terminal voltage per unit time exceeds the second threshold, it is possible to inhibit the battery voltage from sharply rising at the end stage of charging.

Here, as the "terminal voltage" constituting the change rate of the terminal voltage per unit charged electric quantity and the change rate of the terminal voltage per unit time computed by the change rate computation means for example, there is an average of terminal voltages of all the lithium ion secondary batteries constituting the battery pack (an average terminal voltage). Further, in addition, there is the terminal voltage of a representative lithium ion secondary battery singularly selected from among the lithium ion secondary batteries constituting the battery pack, the average of terminal voltages of the plural lithium ion secondary batteries plurally selected from among the lithium ion secondary batteries constituting a battery pack, or the like.

In the above charge-discharge control method, preferably, the positive active material of each of the lithium ion secondary batteries is $LiFe_{(1-X)}M_XPO_4$, wherein M represents at least one of Mn, Cr, Co, Cu, Ni, V, Mo, Ti, Zn, Al, Ga, Mg, B, and Nb, and X is determined by an expression: $0 \leq X \leq 0.5$, the negative active material is a carbonaceous material, and the first threshold or the second threshold is a value corresponding to the change rate of terminal voltage per an electric capacity corresponding to 1% of the theoretical electric capacity, the change rate falling within a range of $5.0 \times 10^{-3}$ V or more and $2.5 \times 10^{-1}$ V or less.

In the case of the lithium ion secondary battery having the positive active material comprising $LiFe_{(1-X)}M_XPO_4$ and the negative active material comprising the carbonaceous material, the average change rate of terminal voltage per a charged electric quantity corresponding to 1% of the theoretical electric capacity in the maximum flat charge-discharge capacity range takes a value of about $2.5 \times 10^{-3}$ (V) at the time of charging. Further, the terminal voltage is about 3.4 V at the upper limit of the maximum flat charge-discharge capacity range. Furthermore, when the electric capacity exceeds the upper limit of the maximum flat charge-discharge capacity range (about 95% of the theoretical electric capacity) and the end of charging comes, the change rate of the terminal voltage per a charged electric quantity corresponding to 1% of the theoretical electric capacity rises sharply and takes a value of about $5.0 \times 10^{-1}$ (V) at a terminal voltage in the vicinity of 4.05 V (the electric capacity is about 99% of the theoretical electric capacity).

Consequently, by setting the first or second threshold at a value corresponding to a value in the range of $5.0 \times 10^{-3}$ (V) to $2.5 \times 10^{-1}$ (V) as the change rate of the terminal voltage per an electric quantity corresponding to 1% of the theoretical electric capacity, it is possible to inhibit the battery voltage from rising sharply. This is because it may be judged that the battery voltage rises sharply thereafter when the change rate of the terminal voltage per unit charged electric quantity of the terminal voltage exceeds the first predetermined threshold or when the change rate of the terminal voltage per unit time of the terminal voltage exceeds the second predetermined threshold.

Alternatively, in the above charge-discharge control method, preferably, the positive active material of each of the lithium ion secondary batteries is $LiFe_{(1-x)}M_xPO_4$, wherein M represents at least one of Mn, Cr, Co, Cu, Ni, V, Mo, Ti, Zn, Al, Ga, Mg, B, and Nb, and X is determined by an expression: $0 \leq X \leq 0.5$, the negative active material of each of the lithium ion secondary batteries is a $Li_4Ti_5O_{12}$ type material, and the first threshold or the second threshold is a value corresponding to the change rate of terminal voltage per an electric capacity corresponding to 1% of the theoretical electric capacity, the change rate falling within a range of $1.0 \times 10^{-3}$ V or more and $1.5 \times 10^{-1}$ V or less.

In the case of the lithium ion secondary battery having the positive active material comprising $LiFe_{(1-x)}M_xPO_4$ and the negative active material comprising the $Li_4Ti_5O_{12}$ type material, the average change rate of terminal voltage per a charged electric quantity corresponding to 1% of the theoretical electric capacity in the flat charge-discharge capacity range ranging from about 3% to about 90% of the theoretical electric capacity takes a value of about $6 \times 10^{-4}$ (V) at the time of charging. Further, the terminal voltage is about 2.05 V at the upper limit of the flat charge-discharge capacity range. Furthermore, when the electric capacity exceeds the upper limit of the flat charge-discharge capacity range (about 90% of the theoretical electric capacity) and the end of charging comes, the change rate of the terminal voltage per a charged electric quantity corresponding to 1% of the theoretical electric capacity rises sharply and takes a value of about $3.0 \times 10^{-1}$ (V) at a terminal voltage in the vicinity of 2.4 V (the electric capacity is about 99% of the theoretical electric capacity).

Consequently, by setting the first or second threshold at a value corresponding to a value in the range of $1.0 \times 10^{-3}$ (V) to $1.5 \times 10^{-1}$ (V) as the change rate of the terminal voltage per an electric quantity corresponding to 1% of the theoretical electric capacity, it is possible to inhibit the battery voltage from rising sharply. This is because it may be judged that the battery voltage rises sharply thereafter when the change rate of the terminal voltage per unit charged electric quantity exceeds the first predetermined threshold or when the change rate of the terminal voltage per unit time exceeds the second predetermined threshold.

BEST MODE FOR CARRYING OUT THE INVENTION

First Embodiment

A first embodiment according to the present invention is explained below in reference to accompanying drawings.

Figure 1:
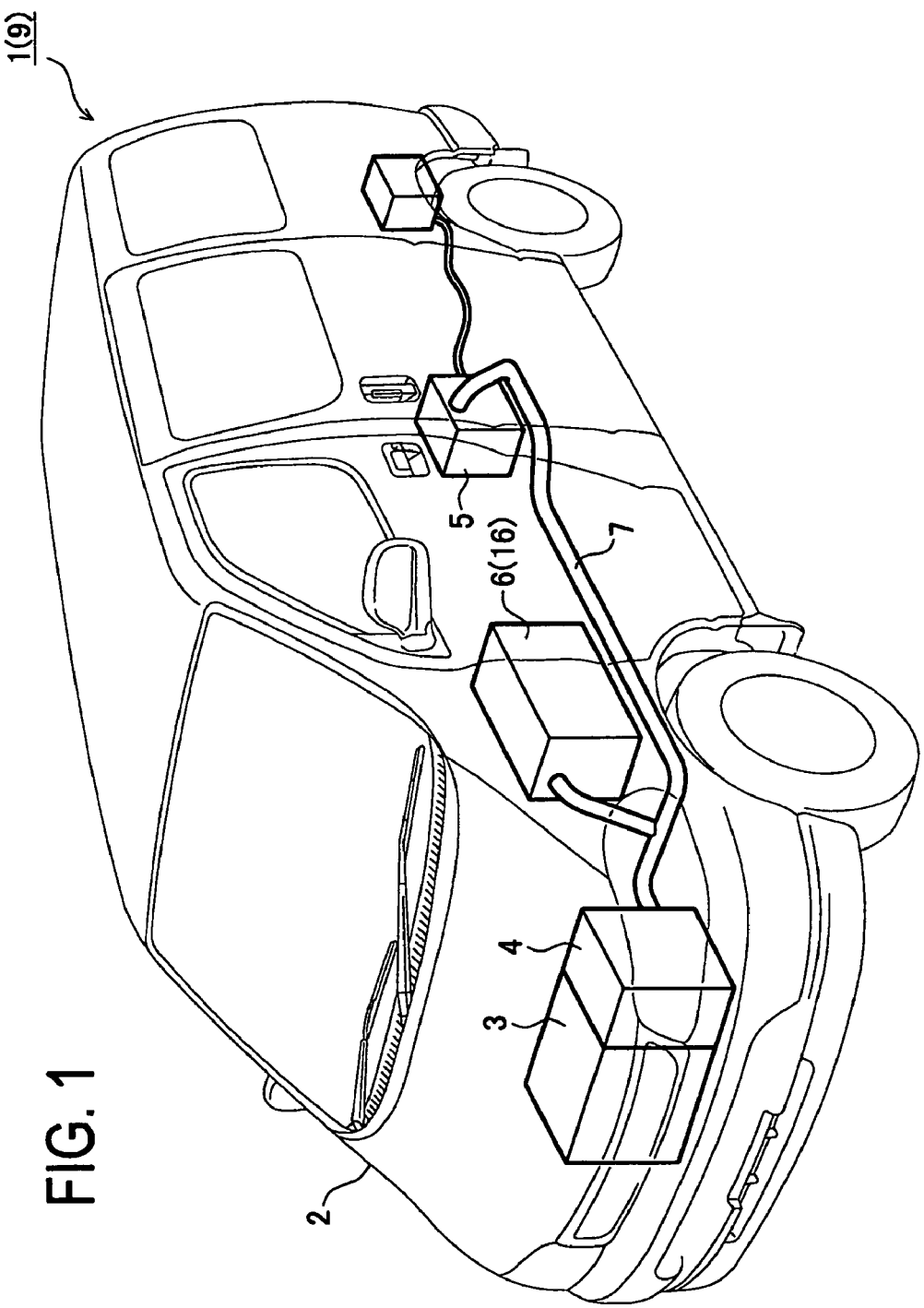
FIG. 1 is a schematic view of a hybrid electric vehicle in first and second embodiments.

A hybrid electric vehicle 1 of the first embodiment is a hybrid electric vehicle that has a vehicle body 2, an engine 3, a front motor 4, a rear motor 5, a cable 7, and a battery pack system 6 and is driven by the combined use of the engine 3, the front motor 4, and the rear motor 5 as shown in FIG. 1. More specifically, the hybrid electric vehicle 1 is configured so as to: use the battery pack system 6 as an electric power source for driving the front motor 4 and the rear motor 5; and be able to travel by using the engine 3, the front motor 4, and the rear motor 5 by a known means.

Figure 2:
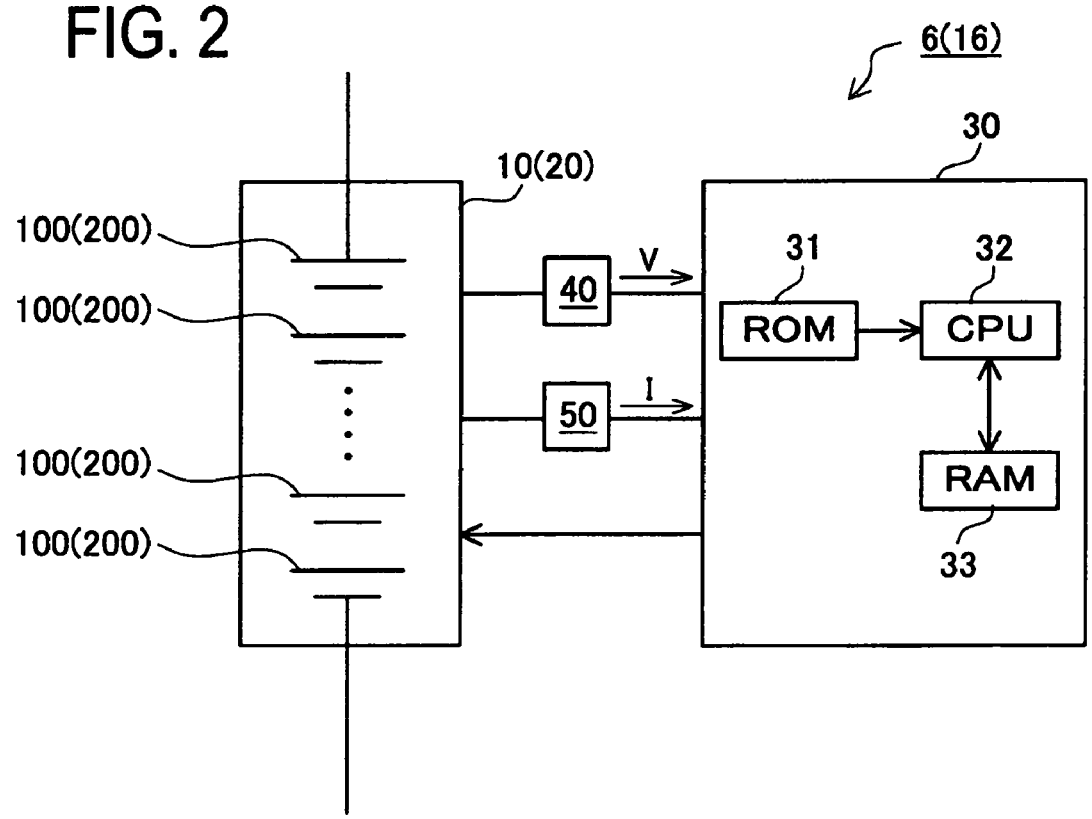
FIG. 2 is a schematic view of a battery pack system in the first and second embodiments.

In those devices, the battery pack system 6 is attached to the vehicle body 2 of the hybrid electric vehicle 1 and connected to the front motor 4 and the rear motor 5 through the cable 7. The battery pack system 6 is provided with a battery pack 10 formed by connecting plural lithium ion secondary batteries 100 (cells) to each other electrically in series, a voltage detector 40, a current detector 50, and a battery controller 30 as shown in FIG. 2. The battery controller 30 has a ROM 31, a CPU 32, a RAM 33, and others.

The current detector 50 detects a current value I flowing in the lithium ion secondary batteries 100 constituting the battery pack 10. Further, the voltage detector 40 detects terminal voltage V of each lithium ion secondary battery 100.

The battery controller 30 integrates the current value I detected with the current detector 50, computes the charged or discharged electric quantity of the lithium ion secondary batteries 100, and estimates the electric capacity stored in the lithium ion secondary batteries 100 from the computed charged or discharged electric quantity. It is then judged whether or not the estimated electric capacity is within a predetermined range (the range of 0.4 Ah to 2.0 Ah in the present embodiment). When it deviates from the predetermined range, the battery controller 30 controls so as to restrict the charging or discharging of the lithium ion secondary batteries 100. Here, the control is carried out over an electric capacity range FP (refer to FIG. 6) including at least a part of a maximum flat charge-discharge capacity range FCmax which will be mentioned later. Here, in the first embodiment, the electric capacity range FP is represented by a charge-discharge capacity range X (refer to FIG. 6) including the maximum flat charge-discharge capacity range FCmax.

Further, the battery controller 30 controls the charging and discharging of the lithium ion secondary batteries 100 based on the terminal voltage V detected with the voltage detector 40. More specifically, the battery controller 30 computes the average of the terminal voltages V detected with the voltage detector 40 (an average terminal voltage Va) and controls so as to stop the charging of the lithium ion secondary batteries 100 constituting the battery pack 10 when the average terminal voltage Va reaches a predetermined charging voltage upper limit Vmax. Further, the battery controller 30, when the lithium ion secondary batteries 100 are charged, computes a change rate D1 (V/Ah) of the average terminal voltage Va per unit charged electric quantity and controls the lithium ion secondary batteries 100 so as to restrict the charging of the lithium ion secondary batteries 100 when the change rate D1 exceeds a predetermined first threshold K1.

Here in the case of the battery pack system 6 of the first embodiment, the charging voltage upper limit Vmax is set at 4.05 V and the value is stored in the ROM 31 of the battery controller 30.

Further, the first threshold K1 is set at 10 (V/Ah) and the value is stored in the ROM 31 of the battery controller 30. Here, in the lithium ion secondary batteries 100, the average change rate of terminal voltage per a charged electric quantity corresponding to 1% of the theoretical electric capacity in the maximum flat charge-discharge capacity range FCmax takes the value of about $2.5 \times 10^{-3}$ V (=0.2 V/80%) (refer to FIG. 6) as it will be described later. Consequently, the average change rate DF1 of the terminal voltages per unit charged electric quantity in the maximum flat charge-discharge capacity range FCmax takes the value of about 0.1 (V/Ah). Consequently, it means that, in the first embodiment, the first threshold K1 is set at a value larger than the average change rate DF1. Further, the first threshold K1=10 (V/Ah) corresponds to $2.2 \times 10^{-1}$ (V) when it is converted into the change rate of the terminal voltage per an electric capacity corresponding to 1% of the theoretical electric capacity (about 2.2 Ah).

Further, as it will be described later, in the charge-discharge capacity range X wherein the lithium ion secondary battery 100 is charged and discharged, the ratio of the range X belonging to the maximum flat charge-discharge capacity range FCmax with respect to the range X is set at about 87% (refer to FIG. 6).

Furthermore, in the first embodiment, the battery controller 30 corresponds to a charge-discharge control means, an electric quantity computation means, an electric capacity estimation means, a charge stopping means, a change rate computation means, and a charge restriction means.

Figure 3:
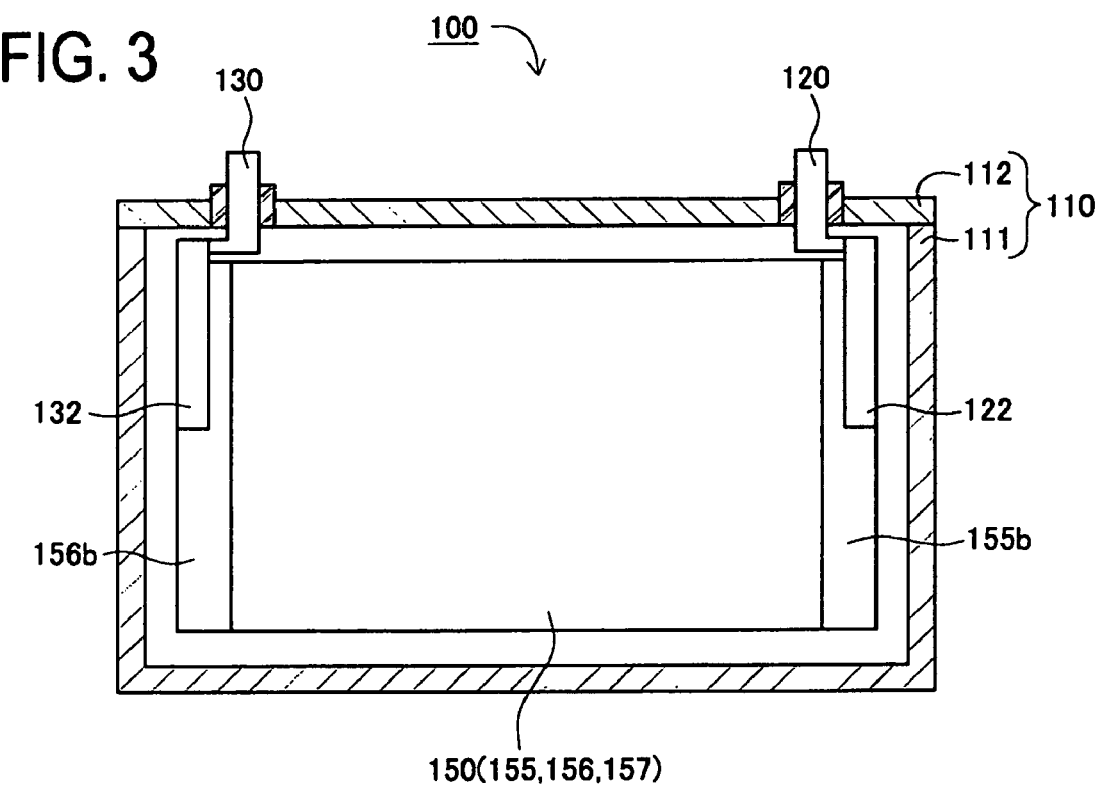
FIG. 3 is a cross sectional view of a lithium ion secondary battery in the first embodiment.

A lithium ion secondary battery 100 is a rectangular sealed-type lithium ion secondary battery provided with a rectangular battery case 110, a positive terminal 120, and a negative terminal 130 as shown in FIG. 3. In the components, the battery case 110 is made of metal and has a rectangular container section 111 constituting a containing space having a rectangular shape and a metallic cover 112. In the battery case 110 (the rectangular container section 111), an electrode plate assembly 150, a positive current collector 122, a negative current collector 132, and others are contained.

Figure 4:
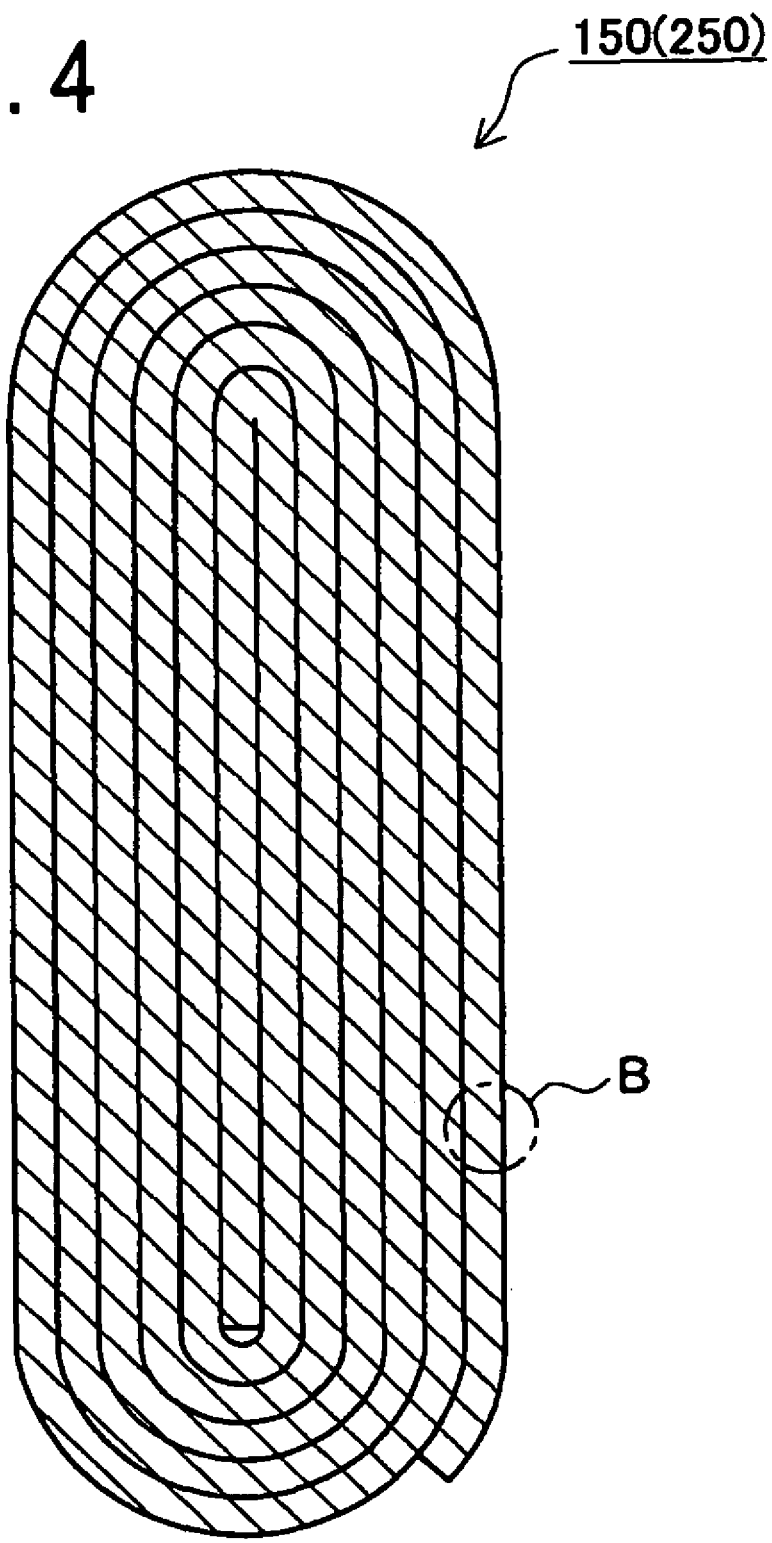
FIG. 4 is a cross sectional view of an electrode plate assembly in the first and second embodiments.
Figure 5:
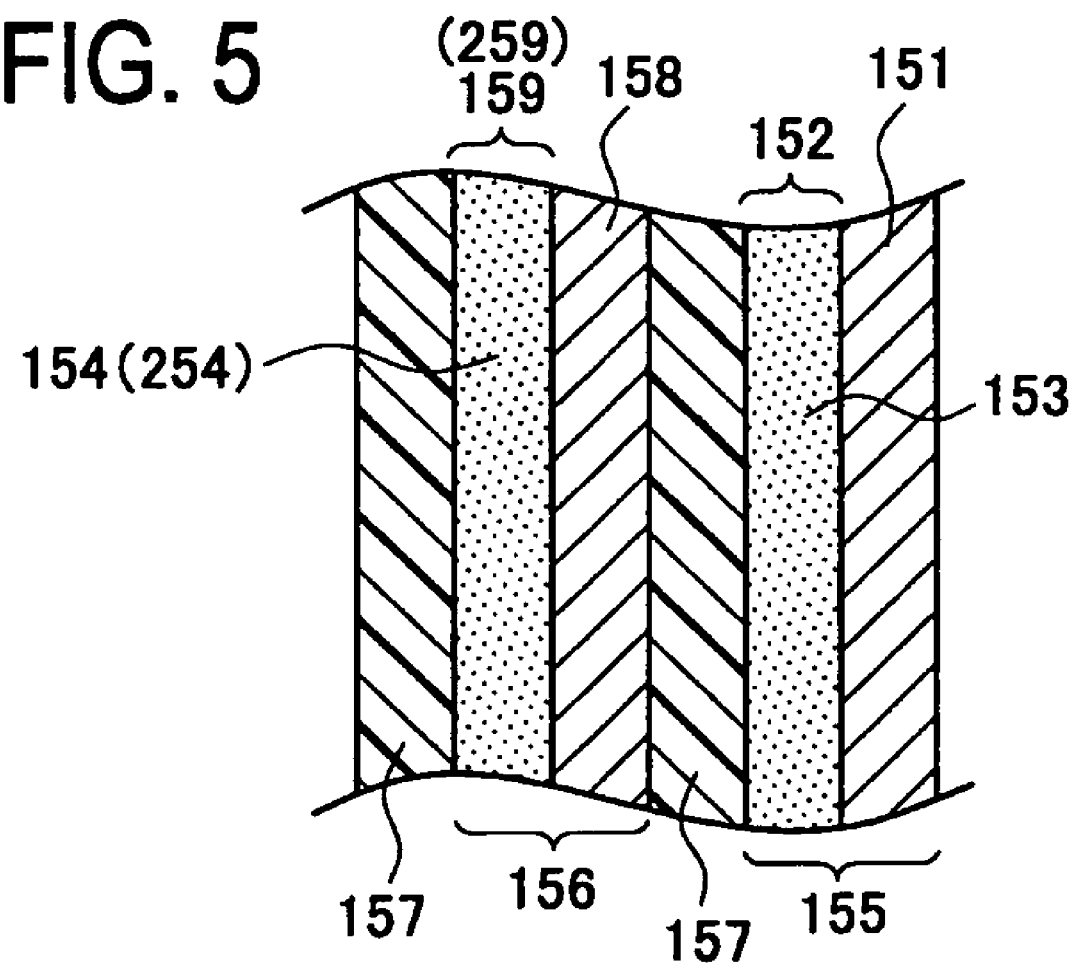
FIG. 5 is a partial enlarged sectional view of the electrode plate assembly in the first and second embodiment, corresponding to an enlarged view of a part B in FIG. 4.

The electrode plate assembly 150 has an elliptical shape in cross section as shown in FIG. 4 and is a flat-shaped wound body formed by winding a sheet-shaped positive electrode plate 155, a sheet-shaped negative electrode plate 156, and sheet-shaped separators 157 as shown in FIG. 5. The electrode plate assembly 150 has: a positive electrode wound section 155b that is located at an end (the right end in FIG. 3) thereof in the axis direction (the transverse direction in FIG. 3) and is formed by overlapping only parts of the positive electrode plate 155 in whorl; and a negative electrode wound section 156b that is located at the other end (the left end in FIG. 3) thereof and is formed by overlapping only parts of the negative electrode plate 156 in whorl. The portion excluding the positive electrode wound section 155b of the positive electrode plate 155 is coated with a positive electrode composite material 152 containing a positive active material 153 (refer to FIG. 5). Likewise, the portion excluding the negative electrode wound section 156b of the negative electrode plate 156 is coated with a negative electrode composite material 159 containing a negative active material 154 (refer to FIG. 5). The positive electrode wound section 155b is electrically connected to the positive terminal 120 through the positive current collector 122. The negative electrode wound section 156b is electrically connected to the negative terminal 130 through the negative current collector 132.

In the first embodiment, $LiFePO_4$ is used as the positive active material 153. Further, a carbonaceous material of a natural graphite type is used as the negative active material 154. More specifically, a natural graphite type material of 20 μm in average particle diameter, 0.67 nm in lattice constant C0, 27 nm in crystallite size Lc, and 0.9 or more in graphitization degree is used. Here, the theoretical electric capacity of a lithium ion secondary battery 100 is about 2.2 Ah.

Figure 6:
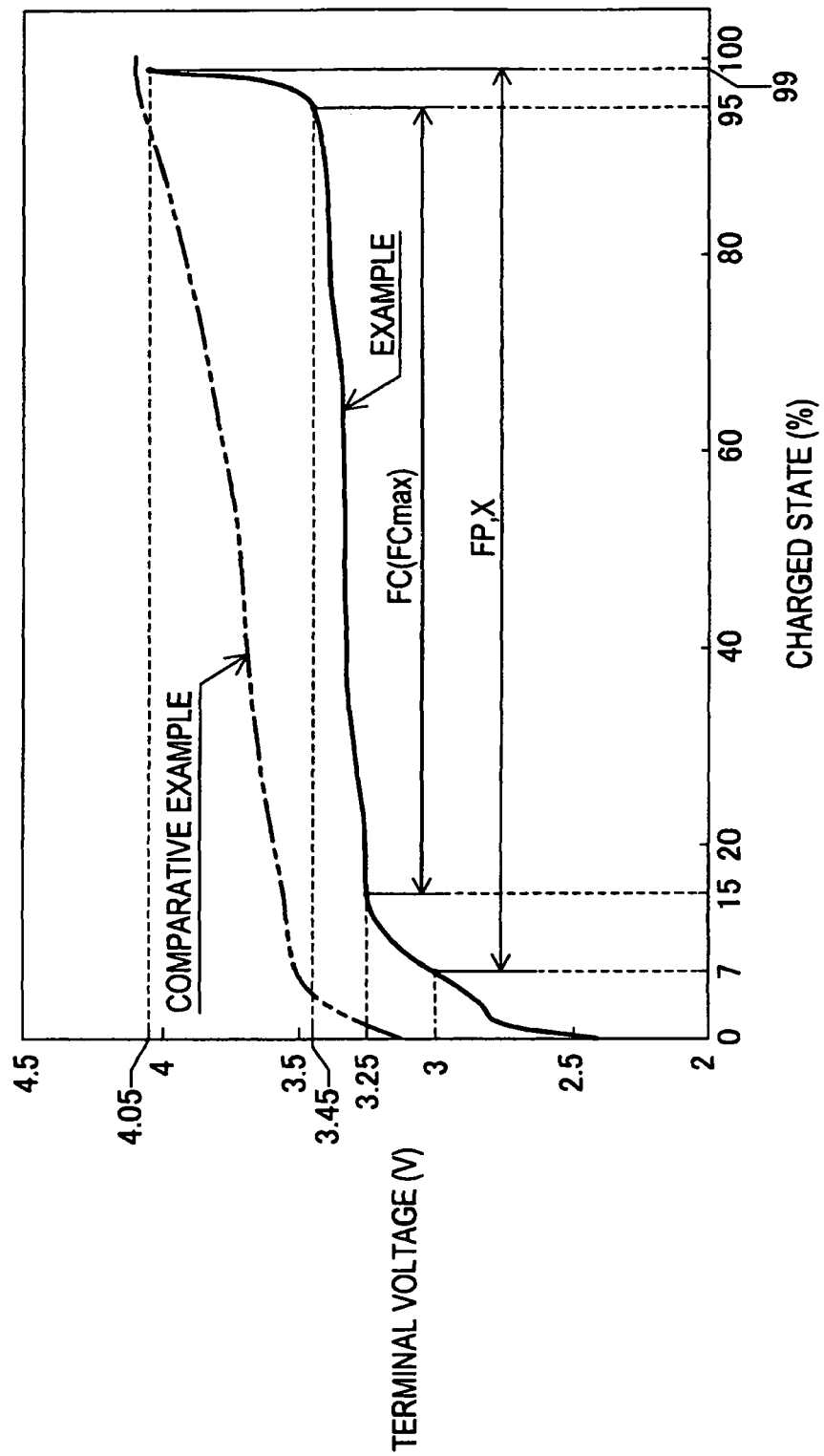
FIG. 6 is a charging characteristic view of a lithium ion secondary battery.
Figure 7:
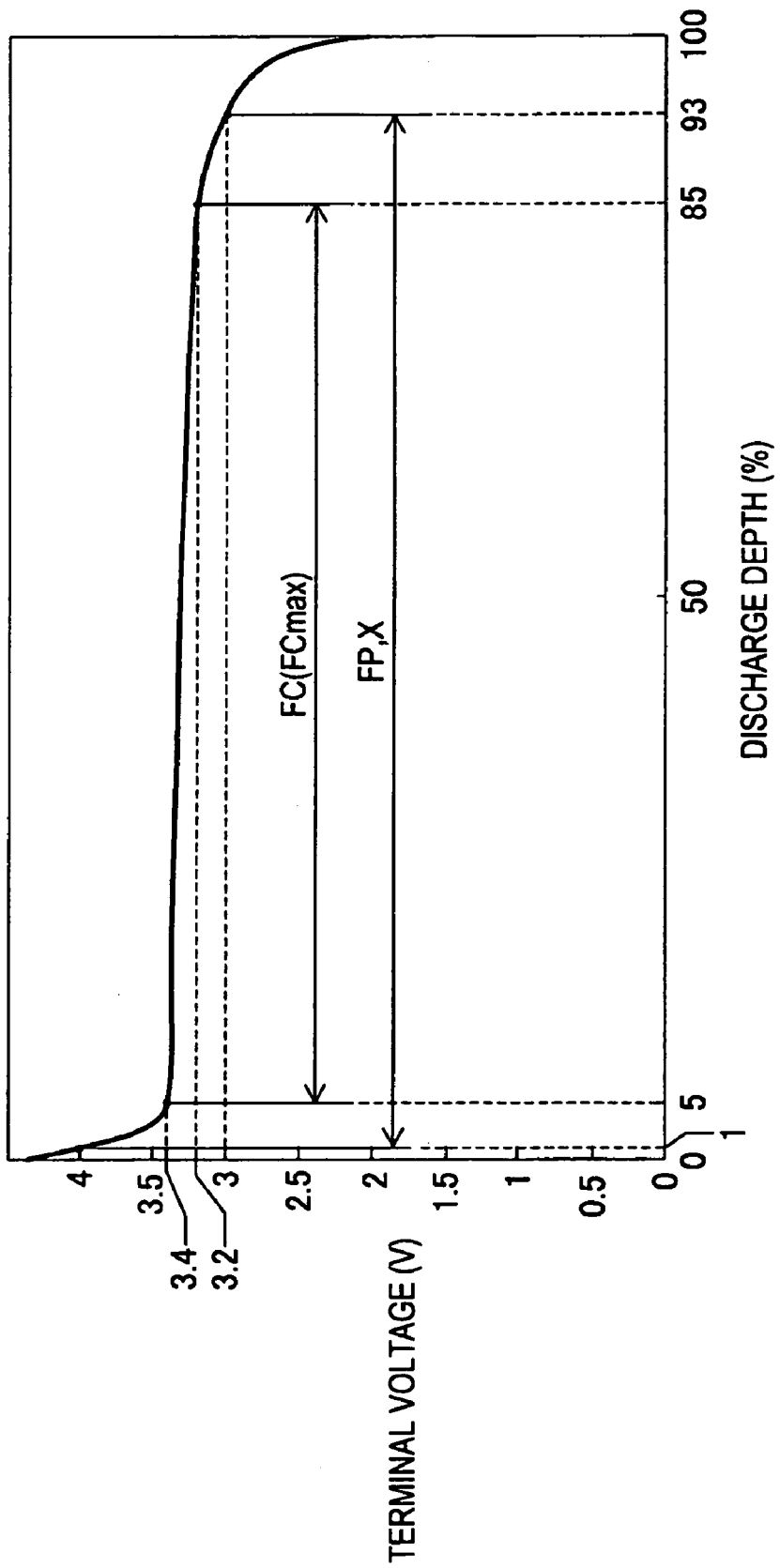
FIG. 7 is a discharging characteristic view of the lithium ion secondary battery.

Successively, FIG. 6 is a graph showing the charging characteristics of the lithium ion secondary battery 100 and FIG. 7 is a graph showing the discharging characteristics of the same. FIG. 6 shows the fluctuation of terminal voltage between the positive terminal 120 and the negative terminal 130 when the lithium ion secondary battery 100 is charged with a current value of 1C. FIG. 7 shows the fluctuation of terminal voltage between the positive terminal 120 and the negative terminal 130 when the lithium ion secondary battery 100 is discharged with a current value of 1 C. Here, the current value 1 C is a current value that allows the lithium ion secondary battery 100 to be charged for an hour up to the theoretical electric capacity that can be accumulated theoretically to the maximum in the positive active material 153 ($LiFePO_4$) contained in the lithium ion secondary battery 100.

As it is obvious from FIGS. 6 and 7, the lithium ion secondary battery 100 is characterized by, in both the cases of charging and discharging with an electric current of 1 C, being able to secure a flat charge-discharge capacity range FC that: accounts for 50% or more of the electric capacity range having the theoretical electric capacity as the upper limit (the range of 0 to 100% charged state in FIG. 6 and the range of 0 to 100% discharged state in FIG. 7); and has the terminal voltage fluctuation of 0.2 V or lower. More specifically, the maximum flat charge-discharge capacity range FCmax that is the widest range of the flat charge-discharge capacity range FC of the lithium ion secondary battery 100 takes the range corresponding to about 80% of the theoretical electric capacity (the range of 15% to 95% charged state in FIG. 6 and the range of 5% to 85% discharged state in FIG. 7).

Consequently, the lithium ion secondary battery 100 can be charged and discharged mostly in the flat charge-discharge capacity range FC and hence can be charged and discharged while the fluctuation of voltage is reduced (while the fluctuation of the internal resistance in the battery is reduced). By so doing, it is possible to obtain a stable output characteristic (IV characteristic) of a small output fluctuation. Moreover, the lithium ion secondary battery 100 can secure the flat charge-discharge capacity range FC corresponding to about 80% of the theoretical electric capacity at a relatively high discharging voltage of 3.4 to 3.2 V as shown in FIG. 7. As a result, it is possible to charge and discharge the lithium ion secondary battery 100 at a relatively high battery voltage of 3.4 to 3.2 V over the capacity range of about 80% of the theoretical electric capacity and hence a high output can be obtained stably.

Further, as shown in FIG. 6, in the lithium ion secondary battery 100, the average change rate of terminal voltage per a charged electric quantity corresponding to 1% of the theoretical electric capacity in the maximum flat charge-discharge capacity range FCmax is about $2.5 \times 10^{-3}$ V (=0.2V/80%). Furthermore, the terminal voltage is about 3.45 V at the upper limit of the maximum flat charge-discharge capacity range FCmax (about 95% charged state in FIG. 6). Yet further, the change rate of the terminal voltage per a charged electric quantity corresponding to 1% of the theoretical electric capacity: increases sharply when the electric capacity exceeds the upper limit of the maximum flat charge-discharge capacity range FCmax and the end stage of charging comes; and takes a value of about $5.0 \times 10^{-1}$ (V) at the terminal voltage in the vicinity of 4.05 V (the electric capacity is about 99% of the theoretical electric capacity). Consequently, it can be also said that the lithium ion secondary battery 100 is characterized in that the change rate D1 (V/Ah) of the terminal voltage per unit charged electric quantity and the change rate D2 (V/s) of the terminal voltage per unit time increase as the electric capacity comes close to the theoretical electric capacity in the end stage of charging when the lithium ion secondary battery 100 is charged until the electric capacity reaches the theoretical electric capacity (100% charged state in FIG. 6).

In FIG. 6, in comparison with the lithium ion secondary battery 100 of the first embodiment, a double-dotted line indicates the fluctuation of the terminal voltage when a lithium ion secondary battery (a comparative example) different from the lithium ion secondary battery 100 only in changing the positive active material to $LiCoO_2$ is charged with an electric current of 1 C. It can be understood that the terminal voltage rises by about 0.55 V (rises from 3.55 V to 4.1 V) when the battery is charged with an electric quantity corresponding to the range of 15% to 95% of the theoretical electric capacity of the lithium ion secondary battery 100, with an electric current of 1 C. Consequently, it can be said that when the lithium ion secondary battery 100 of the first embodiment is charged and discharged mostly in the flat charge-discharge capacity range FC, the lithium ion secondary battery 100 can be charged and discharged while the voltage fluctuation is reduced more (while the fluctuation of the internal resistance in the battery is reduced more) in comparison with the case where a lithium ion secondary battery using $LiCoO_2$ as the positive active material is charged and discharged in the same range.

The production method of the lithium ion secondary battery 100 of the first embodiment is explained below.

Firstly, positive electrode slurry is produced by blending $LiFePO_4$ (the positive active material 153), acetylene black (an auxiliary conductive agent), and polyvinylidene fluoride (a binder resin) at the ratio of 85:5:10 (in weight ratio) and adding N-methylpyrolidone (a dispersion solvent) to the mixture. Successively, the surface of an aluminum foil 151 is coated with the positive electrode slurry and the coated aluminum foil 151 is dried and thereafter subjected to press forming. By so doing, the positive electrode plate 155 produced by coating the surface of the aluminum foil 151 with the positive electrode composite material 152 is obtained (refer to FIG. 5).

Further, negative electrode slurry is produced by blending a natural graphite type carbonaceous material (the negative active material 154), a styrene-butadiene copolymer (a binder resin), and carboxymethylcellulose (a thickening agent) at the ratio of 95:2.5:2.5 (in weight ratio) in water. Successively, the surface of a copper foil 158 is coated with the negative electrode slurry and the coated copper foil 158 is dried and thereafter subjected to press forming. By so doing, a negative electrode plate 156 produced by coating the surface of the copper foil 158 with a negative electrode composite material 159 is obtained (refer to FIG. 5). In the first embodiment, as the natural graphite type carbonaceous material, a natural graphite type material of 20 µm in average particle diameter, 0.67 nm in lattice constant C0, 27 nm in crystallite size Lc, and 0.9 or more in graphitization degree is used.

Here, in the first embodiment, the coating amounts of the positive electrode slurry and the negative electrode slurry are adjusted so that the ratio of the theoretical capacity of the positive pole to the theoretical capacity of the negative pole may be 1:1.5.

Successively, the positive electrode plate 155, the negative electrode plate 156, and the separators 157 are laminated and wound into the electrode plate assembly 150 having an elliptical shape in cross section (refer to FIGS. 4 and 5). Here, when the positive electrode plate 155, the negative electrode plate 156, and the separators 157 are laminated, the positive electrode plate 155 is disposed so that the part of the positive electrode plate 155 not coated with the positive electrode composite material 152 may protrude from an end of the electrode plate assembly 150. Moreover, the negative electrode plate 156 is disposed so that the part of the negative electrode plate 156 not coated with the negative electrode composite material 159 may protrude from the side opposite the non-coated part of the positive electrode plate 155. Thereby the electrode plate assembly 150 having the positive electrode wound section 155b and the negative electrode wound section 156b (refer to FIG. 3) is formed.

In the first embodiment, as the separators 157, a composite porous film comprising a three-layer structure of polypropylene, polyethylene, and polypropylene is used.

Successively, the positive electrode wound section 155b of the electrode plate assembly 150 is connected to the positive terminal 120 through the positive current collector 122. Further, the negative electrode wound section 156b of the electrode plate assembly 150 is connected to the negative terminal 130 through the negative current collector 132. Thereafter, they are contained in the rectangular container 111, the rectangular container 111 and the cover 112 are welded together, and the battery case 110 is sealed. Successively, an electrolyte is poured through a liquid inlet (not shown in the figures) disposed on the cover 112, thereafter the liquid inlet is sealed, and thus the lithium ion secondary battery 100 of the first embodiment is completed.

In the first embodiment, as the electrolyte, a liquid produced by dissolving 1 mole of lithium hexafluorophosphate ($LiPF_6$) in a solution produced by blending EC (ethylene carbonate) and DEC (diethyl carbonate) at the ratio of 4:6 (in volume ratio) is used.

<Measurement of First Capacity>

In the case of the lithium ion secondary battery 100, the charging voltage upper limit Vmax is varied to 3.6 V, 3.8 V, and 4.05 V and the first capacity of each case is measured as an example. More specifically, firstly constant electric current charging is applied with an electric current of ⅕ C until the terminal voltage reaches the charging voltage upper limit Vmax. Thereafter, constant voltage charging is applied at the charging voltage upper limit Vmax and the charging is terminated when the current value of the charging lowers to one tenth of the current value at the commencement of the constant voltage charging. Successively, another constant electric current discharging is applied with an electric current of ⅕ C until the terminal voltage reaches 3 V, and the discharged electric quantity at the time is obtained as the first capacity. Further, as a comparative example, the charging voltage upper limit Vmax is varied to 4.2 V and 4.5 V respectively and the first capacity of each case is measured. The results are shown in Table 1.

Furthermore, as another comparative example, a lithium ion secondary battery different from the lithium ion secondary battery 100 only in changing the positive active material into $LiCoO_2$ is produced. In the case of the lithium ion secondary battery, the charging voltage upper limit Vmax is varied to 4.25 V and 4.5 V and the first capacities are measured and the first capacity maintenance ratios (%) are computed by the cycle tests in the same way as the example. The results are shown in Table 1.

As shown in Table 1, in the case of the lithium ion secondary battery 100, when cycle tests are carried out by setting the charging voltage upper limit Vmax at 3.6 V to 4.05 V, all of the first capacity maintenance ratios are as high as 85% or more

TABLE 1

| | Charging voltage upper limit Vmax (V) | Charging capacity per 1 g of positive active material (mAh/g) | First capacity (Ah) | First capacity maintenance ratio (%) in cycle test | | |
|---|---|---|---|---|---|---|
| | | | | 100 cycles | 500 cycles | 1000 cycles |
| Example (LiFePO4) | 3.6 | 159 | 2.00 | 99 | 93 | 87 |
| | 3.8 | 162 | 2.04 | 99 | 92 | 86 |
| | 4.05 | 163 | 2.05 | 99 | 92 | 85 |
| Comparative Example (LIFePO4) | 4.2 | 163 | 2.05 | 97 | 84 | 70 |
| | 4.5 | 163 | 2.05 | 70 | 0 | — |
| Comparative Example (LiCoO2) | 4.25 | 158 | 2.00 | 92 | 77 | 52 |
| | 4.5 | 169 | 2.20 | 58 | 0 | — |

As shown in Table 1, the first capacities when the charging voltage upper limit Vmax is set at 3.6 V, 3.8 V, and 4.05 V as an example are 2.00 Ah, 2.04 Ah, and 2.05 Ah, respectively. Further, both the first capacities when the charging voltage upper limit Vmax is set at 4.2 V and 4.5 V as the comparative example are 2.05 Ah and are identical to the first capacity when the charging voltage upper limit Vmax is set at 4.05 V. From the results, it is possible to exhibit satisfactory charge-discharge performance of the lithium ion secondary battery 100 even when the charging voltage upper limit Vmax is set to be as low as about 4.05 V and thereby it is possible to inhibit the oxidative decomposition of an electrolyte.

<Cycle Test>

In the case of the lithium ion secondary battery 100, cycle tests are carried out by varying the charging voltage upper limit Vmax to 3.6 V, 3.8 V, and 4.05 V as an example. More specifically, under the environment of 25° C. in temperature, constant electric current charging is applied with an electric current of 5 C until the terminal voltage reaches a charging voltage upper limit Vmax. Thereafter, constant voltage charging is further applied at the charging voltage upper limit Vmax and the charging is terminated when the current value of the charging lowers to one tenth of the current value at the commencement of the constant voltage charging. Successively, constant electric current discharging is applied with an electric current of 5 C until the terminal voltage reaches 3 V. The above combination of the charging and the discharging is regarded as one cycle and the cycle of the charging and discharging is repeated a thousand times. In the tests, the discharge capacities at 100th, 500th, and 1000th cycles are measured respectively and the ratios of the discharge capacities to the first capacities are computed as first capacity maintenance ratios (%).

Further, cycle tests similar to the above example are carried out by varying the charging voltage upper limit Vmax of the lithium ion secondary battery 100 at 4.2 V and 4.5 V as a comparative example and first capacity maintenance ratios (%) are computed.

even after 1000th cycle and the lifetime characteristic is improved. This is presumably because the oxidative decomposition of an electrolyte can be inhibited by lowering the charging voltage upper limit Vmax to 4.05 V or lower.

In contrast, in the case of the lithium ion secondary battery 100, when cycle tests are carried out by setting the charging voltage upper limit Vmax at 4.2 V, the first capacity maintenance ratio lowers to 70% after 1000th cycle and the lifetime characteristic is inferior. This is presumably because the oxidative decomposition of an electrolyte proceeds because of the high charging voltage upper limit Vmax of 4.2 V and affects the results. Further, when cycle tests are carried out by setting the charging voltage upper limit Vmax at 4.5 V, the discharge capacity cannot be secured at 500th cycle. This is presumably because the quantity of an electrolyte reduces and a film is formed on the active material surface in accordance with the progress of the oxidative decomposition of the electrolyte and, as a result, overvoltage rises during charging and discharging.

Further, in the case of the lithium ion secondary battery using $LiCoO_2$ as the positive active material, when a cycle test is carried out by setting the charging voltage upper limit Vmax at 4.25 V, the first capacity maintenance ratio lowers to 52% after 1000th cycle. Furthermore, when a cycle test is carried out by setting the charging voltage upper limit Vmax at 4.5 V, the discharging capacity is not secured at the 500th cycle. This is presumably because the oxidative decomposition of an electrolyte proceeds because of a high charging voltage upper limit Vmax of 4.2 V or higher and affects the results.

Meanwhile, as shown in Table 1, the first capacity in the comparative example is nearly equal to the first capacity of the lithium ion secondary battery 100 when the charging voltage upper limit Vmax is set at 3.6 V to 4.05 V. Consequently, from the result, it can be said that, by charging and discharging the lithium ion secondary battery 100 while setting the charging voltage upper limit Vmax at 3.6 V to 4.05 V, it is possible to drastically improve the lifetime characteristic of the battery while securing an identical electric quantity in comparison with the case of charging and discharging the lithium ion secondary battery using $LiCoO_2$ as the positive active material while setting the charging voltage upper limit Vmax at 4.25 V. In particular, it is also possible to obtain a high output by charging and discharging the lithium ion secondary battery 100 while setting the charging voltage upper limit Vmax at about 4.05 V.

A charge-discharge control method for controlling the charging and discharging of a battery pack 10 of the first embodiment is explained below.

Figure 8:
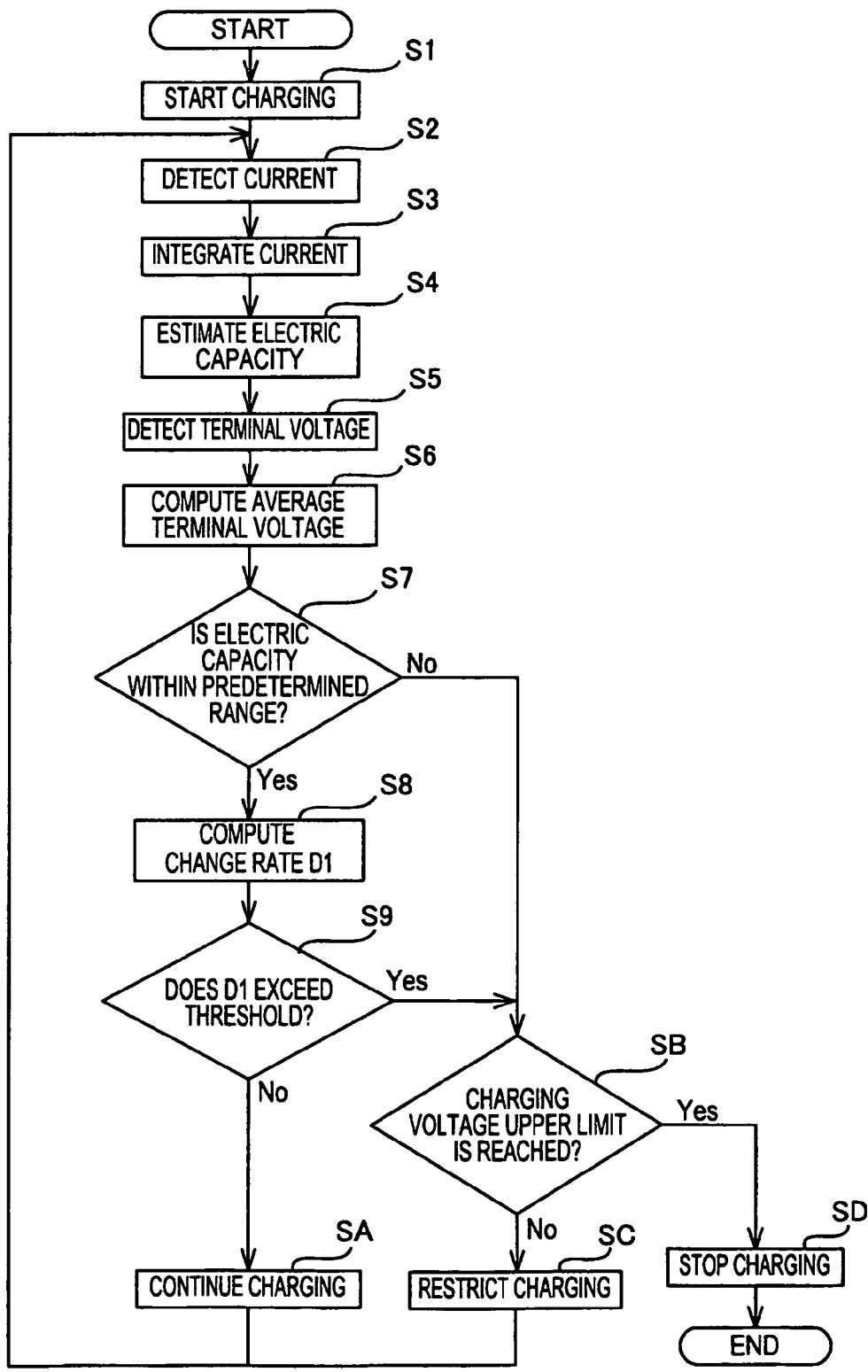
FIG. 8 is a flowchart showing the flow of charge control of a battery pack.

Firstly, a charge control method is explained in reference to FIG. 8. The lithium ion secondary batteries 100 constituting the battery pack 10 start to be charged by the control of the battery controller 30 at Step S1, then the process proceeds to Step S2 where the electric current flowing in the lithium ion secondary batteries 100 is detected with the current detector 50. Successively, at Step S3, the current value I detected with the current detector 50 is integrated and the charged electric quantity of the lithium ion secondary batteries 100 is computed. Successively, the process proceeds to Step S4 where the battery controller 30 estimates the electric capacity stored in the lithium ion secondary batteries 100 from the computed charged electric quantity.

Thereafter, at Step S5, the voltage detector 40 detects the terminal voltage V of each of the lithium ion secondary batteries 100. Successively, at Step S6, the average of the terminal voltages V detected with the voltage detector 40 (the average terminal voltage Va) of the lithium ion secondary batteries 100 is computed.

Meanwhile, the lithium ion secondary battery 100 has the property of being able to secure a flat charge-discharge capacity range FC as stated above. Consequently, when the battery is charged in the maximum flat charge-discharge capacity range FCmax, the fluctuation of the terminal voltage is small and hence it is difficult to accurately compute the charged electric quantity by a method for computing the charged electric quantity in the battery based on the terminal voltage. In contrast, in the first embodiment, the value I of the electric current flowing in the lithium ion secondary batteries 100 is integrated and the charged electric quantity is computed as stated above. By so doing, it is possible to compute the charged electric quantity with a high degree of accuracy even in the maximum flat charge-discharge capacity range FCmax.

At Step 7, successively, it is determined whether or not the estimated electric capacity is within a predetermined range. In the first embodiment, the predetermined range of the electric capacity is set at the range of 0.4 Ah to 2.0 Ah and the range is stored in advance in the ROM 31 of the battery controller 30. When the estimated electric capacity is judged to be in the predetermined range (Yes), the process proceeds to Step S8 and the change rate D1 (V/Ah) of the average terminal voltage Va per unit charged electric quantity is computed based on the current value I integrated from the start of the charging and the variation of the average terminal voltage Va. At Step 9, it is then determined whether or not the change rate D1 exceeds a predetermined threshold K. In the first embodiment, the first threshold K1 is set at 10 (V/Ah).

When the change rate D1 is judged not to exceed the first threshold K1 (No) at Step S9, the process proceeds to Step SA and the charging is continued. Thereafter, the process goes back to Step S2 and the above series of processing is applied.

In contrast, when the change rate D1 is judged to exceed the predetermined first threshold K1 (Yes), the process proceeds to Step SB and whether or not the average terminal voltage Va reaches the charging voltage upper limit Vmax is judged.

Further, when the estimated electric capacity is judged to deviate from the predetermined range (No) at the aforementioned Step S7, the process also proceeds to Step SB and whether or not the average terminal voltage Va reaches the charging voltage upper limit Vmax is judged. Here, in the first embodiment, the charging voltage upper limit Vmax is set at 4.05 V.

When the average terminal voltage Va is judged not to reach the charging voltage upper limit Vmax (No) at Step SB, the process proceeds to Step SC and the charging of the lithium ion secondary batteries 100 is restricted. More specifically, by applying intermittent charging wherein charging and non-charging are repeated for example, it is possible to restrict the charging of the lithium ion secondary batteries 100. Thereafter, the process goes back to Step S2 and the above series of processing is applied.

Meanwhile, when the average terminal voltage Va is judged to reach the charging voltage upper limit Vmax (Yes) at Step SB, the process proceeds to Step SD and the charging of the lithium ion secondary batteries 100 is stopped.

A discharge control method is explained below in reference to FIG. 9. The lithium ion secondary batteries 100 constituting the battery pack 10 start to be discharged by the control of the battery controller 30 at Step U1, then the process proceeds to Step U2, and the electric current flowing in the lithium ion secondary batteries 100 is detected with the current detector 50. Successively, the process proceeds to Step U3 and the current value I detected with the current detector 50 is integrated and the discharged electric quantity of the lithium ion secondary batteries 100 is computed. Successively, the process proceeds to Step U4 and the battery controller 30 estimates the electric capacity stored in the lithium ion secondary batteries 100 from the computed discharged electric quantity.

At Step U5, the voltage detector 40 detects the terminal voltage V of each of the lithium ion secondary batteries 100. Thereafter, the process proceeds to Step U6 and the average of the terminal voltages V detected with the voltage detector 40 (the average terminal voltage Va) of the lithium ion secondary batteries 100 is computed.

Successively, the process proceeds to Step U7 and whether or not the estimated electric capacity is within a predetermined range is judged. When the estimated electric capacity is judged to be in the predetermined range (0.4 Ah to 2.0 Ah) (Yes), the process proceeds to Step U8 and the discharging is continued. Thereafter, the process goes back to Step U2 and the above series of processing is applied.

In contrast, when the estimated electric capacity is judged to deviate from the predetermined range (No), the process proceeds to Step U9 and it is determined whether or not the average terminal voltage Va reaches the discharging voltage lower limit Vmin. Here, in the first embodiment, the discharging voltage lower limit Vmin is set at 3.0 V and the value is stored in advance in the ROM 31 of the battery controller 30.

When the average terminal voltage Va is judged not to reach the discharging voltage lower limit Vmin (No) at Step U9, the process proceeds to Step UA and the discharging of the lithium ion secondary batteries 100 is restricted. More specifically, by applying intermittent discharging wherein discharging and non-discharging are repeated alternately for example, it is possible to restrict the discharging of the lithium ion secondary batteries 100. Thereafter, the process goes back to Step U2 and the above series of processing is applied.

Meanwhile, when the average terminal voltage Va is judged to reach the discharging voltage lower limit Vmin (Yes) at Step U9, the discharging of the lithium ion secondary batteries 100 is stopped at Step UB.

As stated above, in the first embodiment, the lithium ion secondary battery 100 constituting the battery pack 10 is charged and discharged in the electric capacity range wherein the average terminal voltage Va is in the range of 3.0 V to 4.05 V. Here, in the lithium ion secondary battery 100, the electric capacity range wherein the terminal voltage is in the range of 3.0 V to 4.05 V corresponds to the range wherein the electric capacity is about 7% to 99% as it is obvious in reference to FIG. 6. Consequently, in the first embodiment, the part, of the charge-discharge capacity range (the range wherein the electric capacity is about 7% to 99%), belonging to the maximum flat charge-discharge capacity range FCmax (the range wherein the electric capacity is about 15% to 95%) is (95−15)/(99−7)=about 87%. In the first embodiment, therefore, it is possible to charge and discharge the battery pack 10 mostly within the maximum flat charge-discharge capacity range FCmax. As a result, it is possible to charge and discharge the battery pack 10 while the voltage fluctuation in the battery pack 10 is reduced (while the fluctuation of the internal resistance in each lithium ion secondary battery 100 is reduced) and hence it is possible to obtain a stable output having a small output fluctuation.

In the meantime, in the first embodiment, Steps S2 and U2 correspond to the current detection step. Further, Steps S3 and U3 correspond to the electric quantity computation step. Then Steps S4 and U4 correspond to the electric capacity estimation step. Furthermore, Steps S5 and U5 correspond to the voltage detection step. Yet further, Steps S8 to SD and U9 to UB correspond to the charge-discharge control step. In the steps, Steps SD and UB correspond to the charging stop step, Step S8 corresponds to the change rate computation step, and Step SC corresponds to the charging restriction step.

Here, in the first embodiment, the process of Step S4 is repeated from the commencement of charging to the stop of the charging and the process of Step U4 is also repeated from the commencement of discharging to the stop of the discharging. In the first embodiment, therefore, the process corresponding to the electric capacity estimation step (Steps S4 and U4) is applied to each of the lithium ion secondary batteries 100 constituting the battery pack 10 over the electric capacity range FP including at least a part of the maximum flat charge-discharge capacity range FCmax (refer to FIG. 6). More specifically, the process corresponding to the electric capacity estimation step (Steps S4 and U4) is applied over the charge-discharge capacity range X including the maximum flat charge-discharge capacity range FCmax (refer to FIG. 6). As a result, the electric capacity can be estimated based on the integrated current value in the maximum flat charge-discharge capacity range FCmax wherein the fluctuation of the battery voltage is small and hence it is possible to estimate the electric capacity appropriately.

Second Embodiment

The second embodiment according to the present invention is explained below in reference to drawings.

A hybrid electric vehicle 9 of the second embodiment is different from the hybrid electric vehicle 1 of the first embodiment in mounting a battery pack system 16 in place of the battery pack system 6 as shown with the parentheses in FIG. 1 and the others are the same. The battery pack system 16 of the second embodiment is different from the battery pack system 6 of the first embodiment in changing the battery pack 10 into a battery pack 20 as shown with the parentheses in FIG. 2 and the others are the same.

Figure 10:
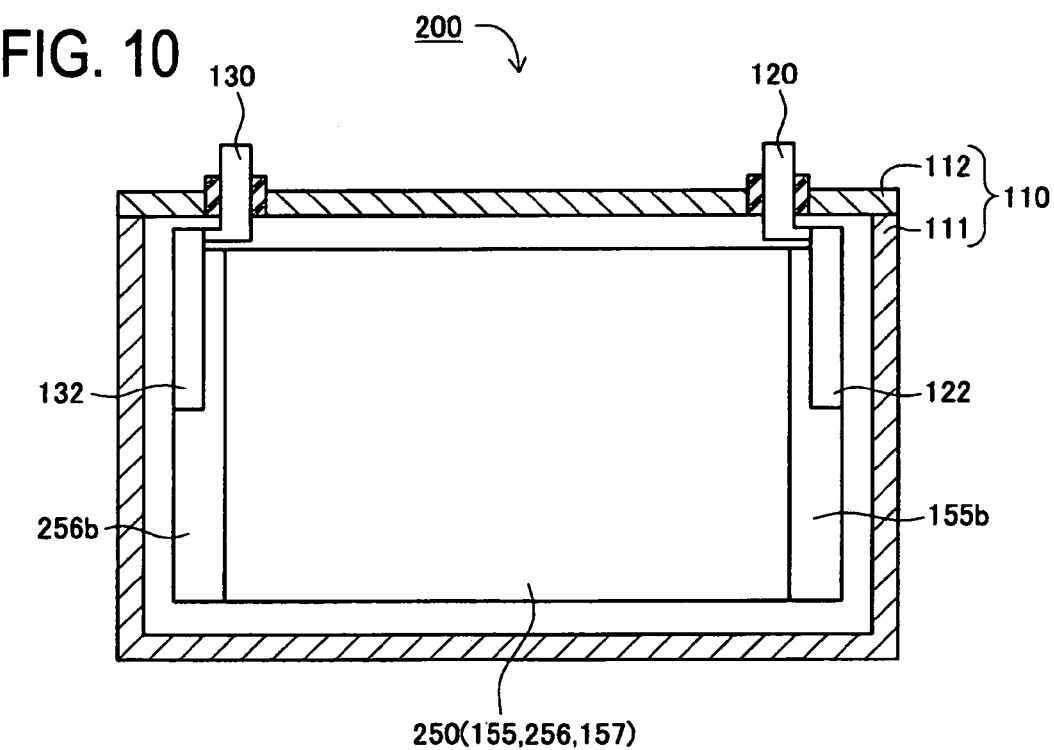
FIG. 10 is a sectional view of a lithium ion secondary battery in a second embodiment.

The battery pack 20 of the second embodiment is different from the battery pack 10 of the first embodiment in using lithium ion secondary batteries 200 instead of the lithium ion secondary batteries 100 and the others are the same. Each of the lithium ion secondary batteries 200 is different from each of the lithium ion secondary batteries 100 of the first embodiment in changing the negative electrode plate 156 into a negative electrode plate 256 as shown in FIG. 10 and the others are the same. The negative electrode plate 256 of the second embodiment is different from the negative electrode plate 156 of the first embodiment in the negative active material. More specifically, $Li_4Ti_5O_{12}$ is used as the negative active material 254 in the second embodiment and the negative electrode plate 256 is produced by forming a sintered compact 259 comprising $Li_4Ti_5O_{12}$ on the surface of a copper foil 158 and press-forming the copper foil 158 (refer to FIG. 5). With regard to the others, the lithium ion secondary batteries 200 of the second embodiment are produced in the same way as the lithium ion secondary batteries 100 of the first embodiment. Here, the theoretical electric capacity of each of the lithium ion secondary batteries 200 is about 2.2 Ah.

Figure 11:
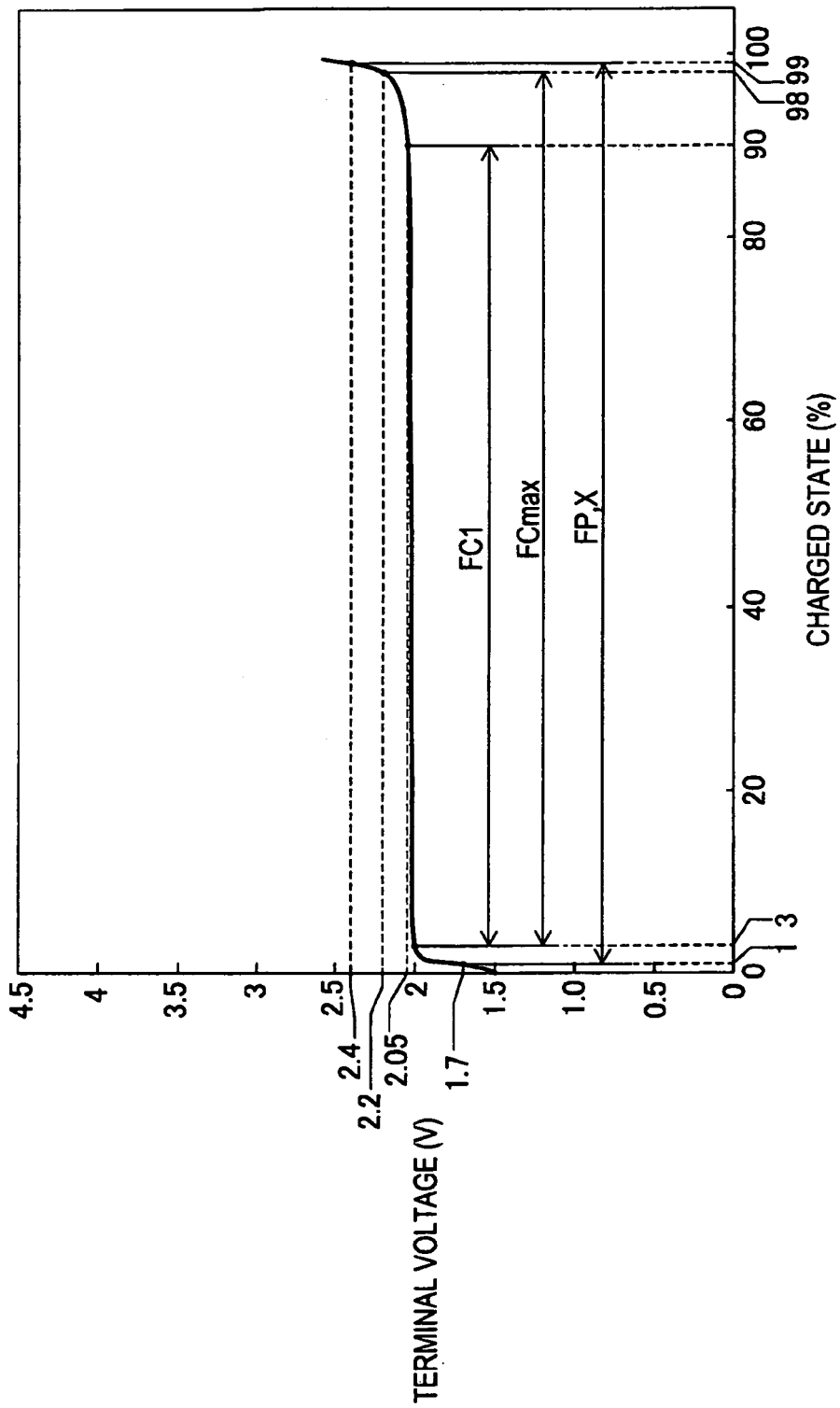
FIG. 11 is a charging characteristic view of the lithium ion secondary battery.
Figure 12:
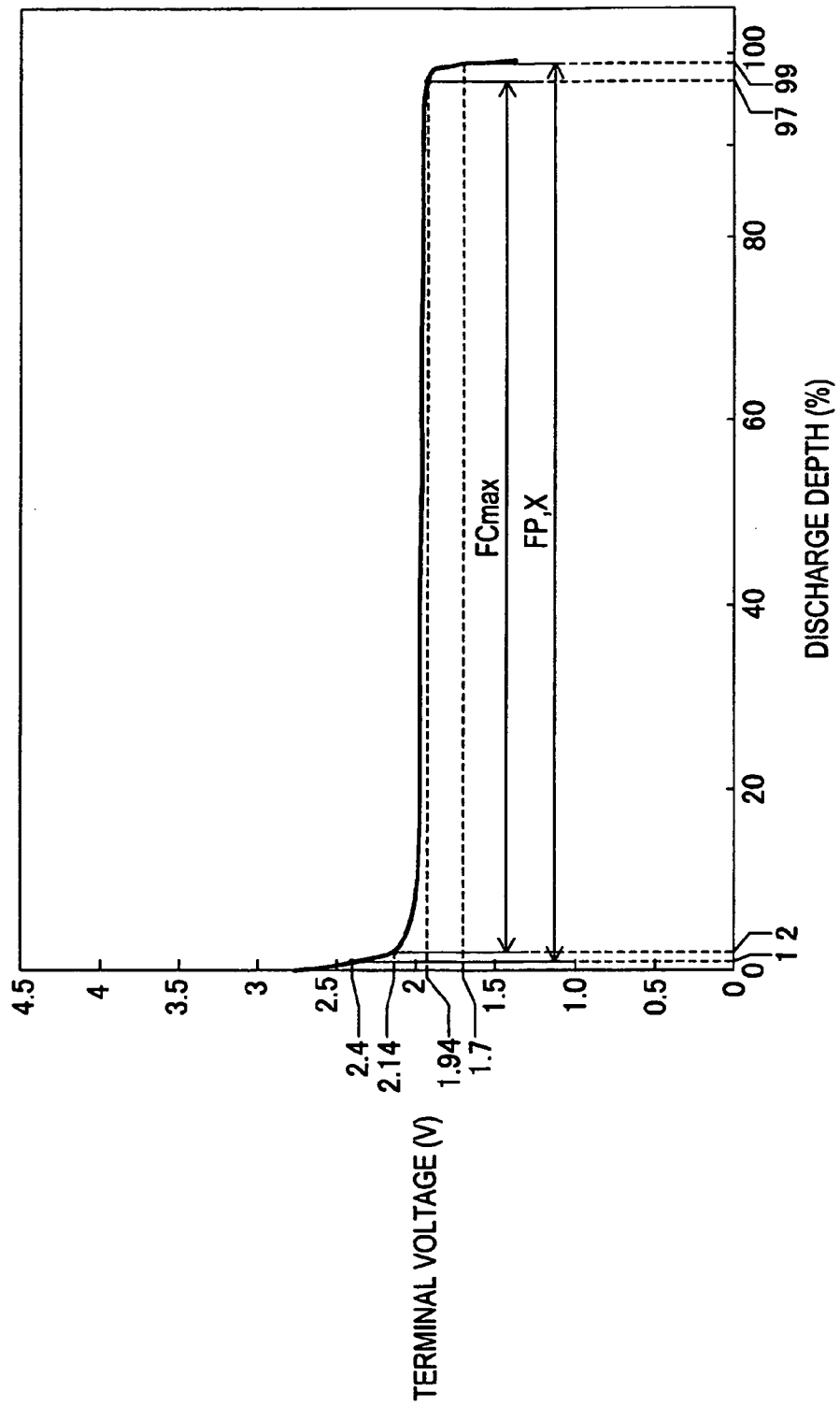
FIG. 12 is a discharging characteristic view of the lithium ion secondary battery.

Successively, FIG. 11 is a graph showing the charging characteristics of the lithium ion secondary battery 200 and FIG. 12 is a graph showing the discharging characteristics of the same. Specifically, FIG. 11 shows the fluctuation of terminal voltage between the positive terminal 120 and the negative terminal 130 when the lithium ion secondary battery 200 is charged with a current value of 1 C. FIG. 12 shows the fluctuation of terminal voltage between the positive terminal 120 and the negative terminal 130 when the lithium ion secondary battery 200 is discharged with a current value of 1 C. Here, the current value 1 C is a current value that allows the lithium ion secondary battery 200 to be charged for an hour up to the theoretical electric capacity that can be accumulated theoretically to the maximum in the positive active material 153 ($LiFePO_4$) contained in the lithium ion secondary battery 200.

As it is obvious from FIGS. 11 and 12, the lithium ion secondary battery 200 is characterized by, in both the cases of charging and discharging with an electric current of 1 C, being able to secure a flat charge-discharge capacity range FC that: accounts for 50% or more of the electric capacity range having the theoretical electric capacity as the upper limit (the range of 0 to 100% charged state in FIG. 11 and the range of 0 to 100% discharged state in FIG. 12); and has the terminal voltage fluctuation of 0.2 V or lower. More specifically, the maximum flat charge-discharge capacity range FCmax that is the widest range of the flat charge-discharge capacity range FC of the lithium ion secondary battery 200 takes the range corresponding to about 95% of the theoretical electric capacity (the range of about 3% to 98% charged state in FIG. 11 and the range of about 2% to 97% discharged state in FIG. 12).

Consequently, the lithium ion secondary battery 200 can be charged and discharged mostly in the flat charge-discharge capacity range FC and hence can be charged and discharged while the fluctuation of voltage is reduced (while the fluctuation of the internal resistance in the battery is reduced). By so doing, it is possible to obtain a stable output characteristic (IV characteristic) of a small output fluctuation. In the range of the discharge depth of about 10% to 97% in the flat charge-discharge capacity range FC in particular, the fluctuation of the terminal voltage is as small as 0.05 V (lowers from 1.99 V to 1.94 V). As a result, it is possible to obtain a very stable output when the lithium ion secondary battery 200 is discharged in the range.

Further, as shown in FIG. 11, during the charging of the lithium ion secondary battery 200, the average change rate of terminal voltage per an electric capacity corresponding to 1% of the theoretical electric capacity in the flat charge-discharge capacity range FC1 ranging from about 3% to 90% of the theoretical electric capacity is about $6\times10^{-4}$ V. Furthermore, the terminal voltage is about 2.05 V at the upper limit of the flat charge-discharge capacity range FC1. Yet further, the change rate of terminal voltage per an electric capacity corresponding to 1% of the theoretical electric capacity: increases when the electric capacity exceeds the upper limit of the flat charge-discharge capacity range FC1 (about 90% of the theoretical electric capacity) and the end stage of charging comes; and takes a value of $3.0\times10^{-1}$ (V) or more at a terminal voltage in the vicinity of 2.4 V (the electric capacity is about 99% of the theoretical electric capacity). Consequently, it can be also said that the lithium ion secondary battery 200 is characterized in that the change rate D1 (V/Ah) of terminal voltage per unit charged electric quantity and the change rate D2 (V/s) of terminal voltage per unit time increase as the electric capacity comes close to the theoretical electric capacity in the end stage of charging when the lithium ion secondary battery 200 is charged until the electric capacity reaches the theoretical electric capacity (100% charged state in FIG. 11).

Here in the case of the battery pack system 16 of the second embodiment, the charging voltage upper limit Vmax is set at 2.4 V and the value is stored in the ROM 31 of the battery controller 30. Further, the first threshold K1 is set at 2.5 V/Ah and the value is stored in the ROM 31 of the battery controller 30. Here, in the lithium ion secondary battery 200 of the second embodiment, the average change rate of terminal voltage per a charged electric quantity corresponding to 1% of the theoretical electric capacity in the maximum flat charge-discharge capacity range FCmax takes the value of about $2.0\times10^{-3}$ V (=0.2 V/95%) (refer to FIG. 11). Consequently, the average change rate DF1 of terminal voltage per unit charged electric quantity in the maximum flat charge-discharge capacity range FCmax takes the value of about $9\times10^{-2}$ (V/Ah). Consequently, it means that, in the second embodiment, the first threshold K1 is set at a value larger than the average change rate DF1. Further, the first threshold K1=2.5 (V/Ah) corresponds to $1.1\times10^{-1}$ (V) when it is converted into the change rate of terminal voltage per an electric capacity corresponding to 1% of the theoretical electric capacity (about 2.2 Ah).

Further, in the charge-discharge capacity range X wherein the lithium ion secondary battery 200 is charged and discharged, the ratio of the range X belonging to the maximum flat charge-discharge capacity range FCmax with respect to the range X is set at about 97% (refer to FIG. 11).

<Measurement of First Capacity>

In the case of the lithium ion secondary battery 200, the charging voltage upper limit Vmax is varied to 2.1 V, 2.2 V, and 2.4 V and the first capacity of each case is measured as an example. More specifically, constant electric current charging is first applied with an electric current of ⅕ C until the terminal voltage reaches the charging voltage upper limit Vmax. Thereafter, constant voltage charging is applied at the charging voltage upper limit Vmax and the charging is terminated when the current value of the charging lowers to one tenth of the current value at the commencement of the constant voltage charging. Successively, constant electric current discharging is applied with an electric current of ⅕ C until the terminal voltage reaches 1.7 V, and the discharged electric quantity at the time is obtained as the first capacity. Further, as a comparative example, the charging voltage upper limit Vmax is varied to 3 V and 4 V and the first capacity of each case is measured. The results are shown in Table 2.

TABLE 2

| | Charging voltage upper limit | Charging capacity per 1 g of positive active material | First capacity | First capacity maintenance ratio (%) in cycle test | | |
|---|---|---|---|---|---|---|
| | Vmax (V) | (mAh/g) | (Ah) | 100 cycles | 500 cycles | 1000 cycles |
| Example (LiFePO4) | 2.1 | 159 | 2.00 | 99 | 93 | 87 |
| | 2.2 | 162 | 2.04 | 99 | 92 | 86 |
| | 2.4 | 163 | 2.05 | 99 | 92 | 85 |
| Comparative Example (LIFePO4) | 3 | 163 | 2.05 | 70 | 0 | — |
| | 4 | 163 | 2.05 | 17 | 0 | — |
| (Comparative Example (LiCoO2) | 4.25 | 158 | 2.00 | 92 | 77 | 52 |
| | 4.5 | 169 | 2.20 | 58 | 0 | — |

As shown in Table 2, the first capacities when the charging voltage upper limit Vmax is set at 2.1 V, 2.2 V, and 2.4 V as an example are 2.00 Ah, 2.04 Ah, and 2.05 Ah, respectively. Further, the first capacities when the charging voltage upper limit Vmax is set at 3 V and 4 V as a comparative example are 2.05 Ah in both the cases and are identical to the first capacity when the charging voltage upper limit Vmax is set at 2.4 V. From the results, it is possible to exhibit satisfactory charge-discharge performance of the lithium ion secondary battery 200 even when the charging voltage upper limit Vmax is set at a low value of about 2.4 V and thereby it is possible to inhibit the oxidative decomposition of an electrolyte.

<Cycle Test>

Successively, in the case of the lithium ion secondary battery 200, cycle tests are carried out by varying the charging voltage upper limit Vmax to 2.1 V, 2.2 V, and 2.4 V as an example. More specifically, under the environment of 25° C. in temperature, constant electric current charging is applied with an electric current of 5 C until the terminal voltage reaches a charging voltage upper limit Vmax. Thereafter, constant voltage charging is further applied at the charging voltage upper limit Vmax and the charging is terminated when the current value of the charging lowers to one tenth of the current value at the commencement of the constant voltage charging. Successively, constant electric current discharging is applied with an electric current of 5 C until the terminal voltage reaches 1.7 V. The above combination of the charging and the discharging is regarded as one cycle and the cycle of the charging and discharging is repeated a thousand times. In the tests, the discharge capacities at 100th, 500th, and 1000th cycles are measured respectively and the ratios of the discharge capacities to the first capacities are computed as first capacity maintenance ratios (%).

Further, cycle tests similar to the above example are carried out by varying the charging voltage upper limit Vmax of the lithium ion secondary battery 200 to 3 V and 4 V as a comparative example and first capacity maintenance ratios (%) are computed.

Furthermore, as another comparative example, a lithium ion secondary battery different from the lithium ion secondary battery 200 only in changing the positive active material into $LiCoO_2$ is produced. In the case of the lithium ion secondary battery, the charging voltage upper limit Vmax is varied to 4.25 V and 4.5 V and the first capacities are measured and the first capacity maintenance ratios (%) are computed by the cycle tests in the same way as the example. The results are shown in Table 2.

As shown in Table 2, in the case of the lithium ion secondary battery 200, when cycle tests are carried out by setting the charging voltage upper limit Vmax at 2.1 V to 2.4 V, all of the first capacity maintenance ratios are as high as 85% or more even after 1000th cycle and the lifetime characteristic is improved. This is presumably because the oxidative decomposition of an electrolyte can be inhibited by lowering the charging voltage upper limit Vmax to 2.4 V or lower.

In contrast, in the case of the lithium ion secondary battery 200, when cycle tests are carried out by setting the charging voltage upper limit Vmax at 3 V, the first capacity maintenance ratio lowers to 70% after 100th cycle and the discharge capacity cannot be secured at 500th cycle. Further, when cycle tests are carried out by setting the charging voltage upper limit Vmax at 4 V, the first capacity maintenance ratio lowers to 17% after 100th cycle and the discharge capacity cannot be secured at 500th cycle. This is presumably because the quantity of an electrolyte reduces and a film is formed on the active material surface in accordance with the progress of the oxidative decomposition of the electrolyte and, as a result, overvoltage rises during charging and discharging.

Further, in the case of the lithium ion secondary battery using $LiCoO_2$ as the positive active material, when a cycle test is carried out by setting the charging voltage upper limit Vmax at 4.25 V, the first capacity maintenance ratio lowers to 52% after 1000th cycle. Furthermore, when a cycle test is carried out by setting the charging voltage upper limit Vmax at 4.5 V, the discharging capacity is not secured at the 500th cycle. This is presumably because the oxidative decomposition of an electrolyte proceeds because of a high charging voltage upper limit Vmax of 4.2 V or higher and affects the results.

Meanwhile, as shown in Table 2, the first capacity in the comparative example is nearly equal to the first capacity of the lithium ion secondary battery 200 when the charging voltage upper limit Vmax is set at 2.1 V to 2.4 V. Consequently, from the result, it can be said that, by charging and discharging the lithium ion secondary battery 200 while setting the charging voltage upper limit Vmax at 2.1 V to 2.4 V, it is possible to drastically improve the lifetime characteristic of the battery while securing an identical electric quantity in comparison with the case of charging and discharging the lithium ion secondary battery using $LiCoO_2$ as the positive active material while setting the charging voltage upper limit Vmax at 4.25 V.

A charge-discharge control method for controlling the charging and discharging of a battery pack 20 of the second embodiment is explained below.

Firstly, a charge control method is explained in reference to FIG. 8. After the lithium ion secondary batteries 200 constituting the battery pack 20 start to be charged at Step S1, the processes of Steps S2 to S6 are applied in the same way as the first embodiment. At Step S7, successively, it is determined whether or not the estimated electric capacity is within a predetermined range. In the second embodiment, as in the first embodiment, the predetermined range of the electric capacity is set at the range of 0.4 Ah to 2.0 Ah in the same way as the first embodiment. When the estimated electric capacity is judged to be in the predetermined range (Yes), the process proceeds to Step S8 and the change rate D1 (V/Ah) of the average terminal voltage Va per unit charged electric quantity is computed based on the current value I integrated from the start of the charging and the variation of the average terminal voltage Va. It is then determined at Step S9 whether or not the change rate D1 exceeds a predetermined first threshold K1. Here, in the second embodiment, the first threshold K1 is set at 2.5 (V/Ah).

When the change rate D1 is judged not to exceed the first threshold K1 (No) at Step S9, the process proceeds to Step SA and the charging is continued. Thereafter, the process goes back to Step S2 and the above series of processing is applied.

In contrast, when the change rate D1 is judged to exceed the first threshold K1 (Yes), the process proceeds to Step SB and whether or not the average terminal voltage Va reaches the charging voltage upper limit Vmax is judged. Further, also in the case where the estimated electric capacity is judged to deviate from the predetermined range (No) at the aforementioned Step S7, the process proceeds to Step SB and whether or not the average terminal voltage Va reaches the charging voltage upper limit Vmax is judged. Here, in the second embodiment, the charging voltage upper limit Vmax is set at 2.4 V.

When the average terminal voltage Va is judged not to reach the charging voltage upper limit Vmax (No) at Step SB, the process proceeds to Step SC and the charging of the lithium ion secondary batteries 200 is restricted. Thereafter, the process goes back to Step S2 and the above series of processing is applied.

Meanwhile, when the average terminal voltage Va is judged to reach the charging voltage upper limit Vmax (Yes) at Step SB, the process proceeds to Step SD and the charging of the lithium ion secondary batteries 200 is stopped.

Figure 9:
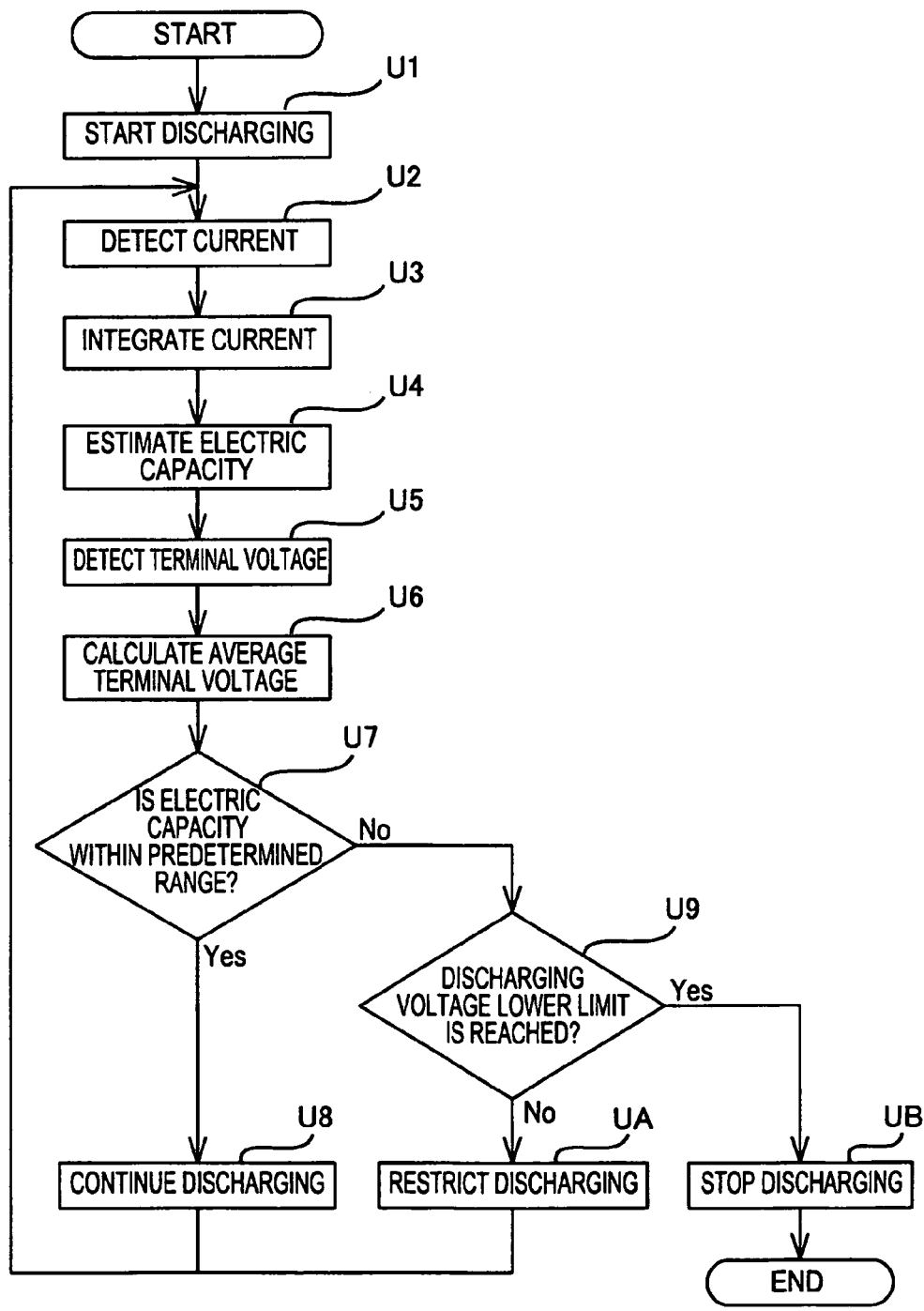
FIG. 9 is a flowchart showing the flow of discharge control of the battery pack.

The following explanation is given to discharge control in reference to FIG. 9. After the lithium ion secondary batteries 200 constituting the battery pack 20 start to be discharged firstly at Step U1, the processes of Steps U2 to U6 are applied in the same way as the first embodiment. Successively, the process proceeds to Step U7 and whether or not the estimated electric capacity is within a predetermined range is judged. When the estimated electric capacity is judged to be in the predetermined range (0.4 Ah to 2.0 Ah) (Yes), the process proceeds to Step U8 and the discharging is continued. Thereafter, the process goes back to Step U2 and the above series of processing is applied.

In contrast, when the estimated electric capacity is judged to deviate from the predetermined range (No), the process proceeds to Step U9 and whether or not the average terminal voltage Va reaches the discharging voltage lower limit Vmin is judged. Here, in the second embodiment, the discharging voltage lower limit Vmin is set at 1.7 V.

When the average terminal voltage Va is judged not to reach the discharging voltage lower limit Vmin (No) at Step U9, the process proceeds to Step UA and the discharging of the lithium ion secondary batteries 200 is restricted. Thereafter, the process goes back to Step U2 and the above series of processing is applied.

Meanwhile, when the average terminal voltage Va is judged to reach the discharging voltage lower limit Vmin (Yes) at Step U9, the process proceeds to Step UB and the discharging of the lithium ion secondary batteries 200 is stopped.

As stated above, in the second embodiment, the lithium ion secondary batteries 200 constituting a battery pack 20 are charged and discharged in the electric capacity range wherein the average terminal voltage Va is in the range of 1.7 V to 2.4 V. Here, the electric capacity range wherein the average terminal voltage Va is in the range of 1.7 V to 2.4 V corresponds to the range wherein the electric capacity is about 1.5% to 99.5% as it is obvious in reference to FIG. 11. Consequently, in the second embodiment, the part, of the electric capacity range wherein the charging and discharging are allowed (the range wherein the electric capacity is about 1.5% to 99.5%), belonging to the maximum flat charge-discharge capacity range FCmax (the range wherein the electric capacity is about 3% to 98%) is (98−3)/(99.5−1.5)=about 97%. In the second embodiment, therefore, it is possible to charge and discharge the battery pack 20 mostly within the maximum flat charge-discharge capacity range FCmax. As a result, it is possible to charge and discharge the battery pack 20 while the voltage fluctuation in the battery pack 20 is reduced (while the fluctuation of the internal resistance in each lithium ion secondary battery 200 is reduced) and hence it is possible to obtain a stable output having a small output fluctuation.

Although the present invention is explained above based on the first and second embodiments, it goes without saying that the present invention is not limited to the aforementioned embodiments but can be modified and applied arbitrarily within the range not deviating from the tenor of the present invention.

In both the first and second embodiments, lithium ion secondary batteries 100 and 200 characterized by being able to secure a flat charge-discharge capacity range FC can be produced by using $LiFePO_4$ as the positive active material. This is because a positive electrode produced by using $LiFePO_4$ as the positive active material is characterized by being able to charge and discharge an electric quantity in the range corresponding to about 80% of the theoretical electric capacity with scarce potential fluctuation at a charge-discharge potential in the vicinity of 3.4 V when the battery is charged and discharged with an electric current of 1 C.

Figure 13:
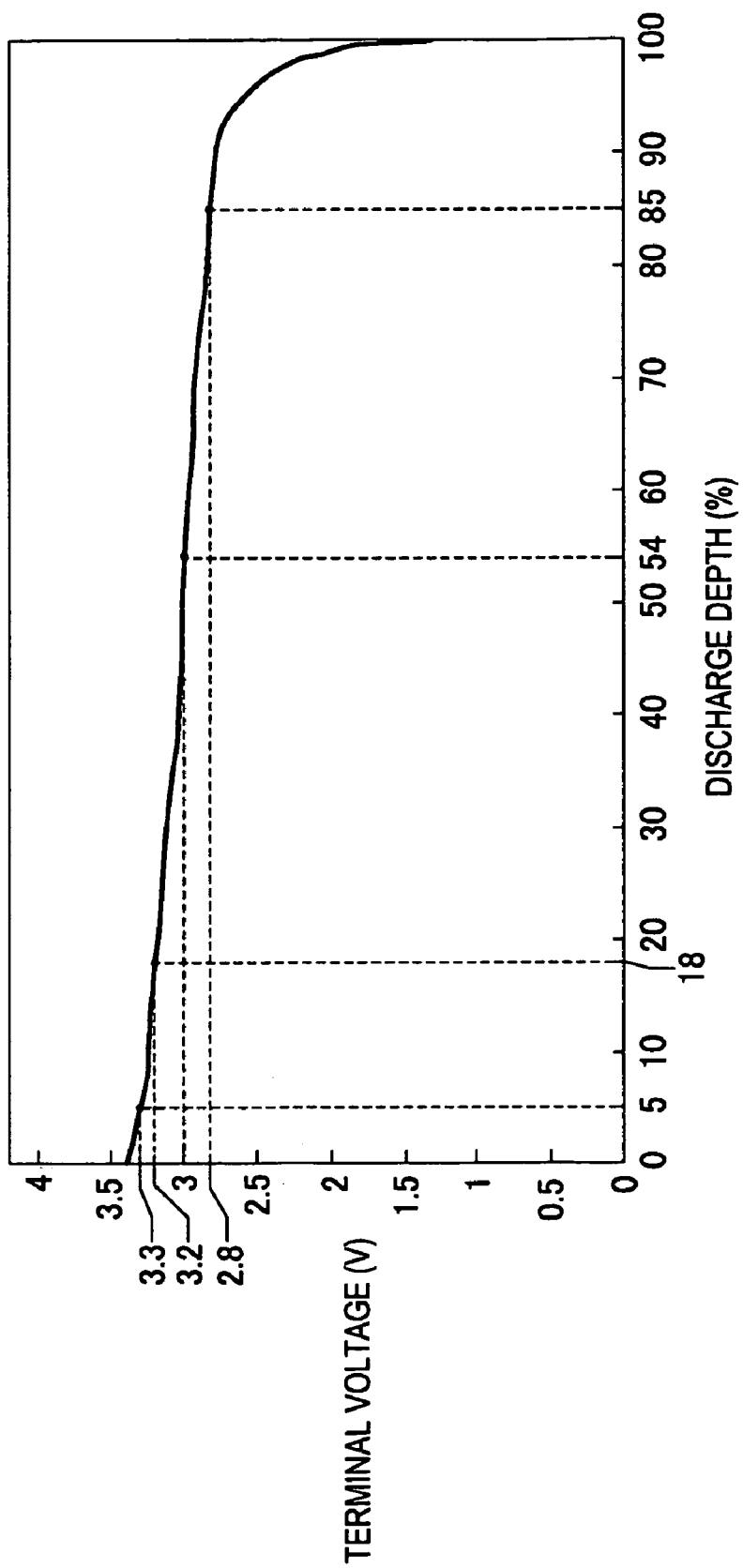
FIG. 13 is a discharging characteristic view of a lithium ion secondary battery in a comparative example.

Even in the case where $LiFePO_4$ is used as the positive active material, however, when an alloy produced by mixing Sn and Ni at the weight ratio of 9:1 is used as the negative active material for example, the battery voltage tends to reduce gradually during discharging and flat charge-discharge capacity range cannot be secured as shown in FIG. 13. More specifically, the capacity range wherein the fluctuation of terminal voltage is 0.2 V or lower during discharging with an electric current of 1 C is about 35% of the theoretical electric capacity and is smaller than 50%. This is because a negative electrode produced by using a negative active material of an alloy type: is characterized in that the potential increases and decreases gradually over the whole charge-discharge range during charging and discharging with an electric current of 1 C; and does not have a capacity range wherein the battery can be charged and discharged while the potential scarcely fluctuates.

Consequently, even when $LiFePO_4$ is used as the positive active material, it is impossible to obtain a lithium ion secondary battery characterized by being able to secure a flat charge-discharge capacity range unless a material, such as a carbonaceous material or a $Li_4Ti_5O_{12}$ type material, characterized by allowing charging and discharging with a small potential fluctuation (fluctuation of 0.2 V or less) over the range of not less than 50% of the positive electrode theoretical capacity is used as the negative active material.

Further, in both the first and second embodiments, an change rate D1 (V/Ah) of terminal voltage per unit charged electric quantity is computed at Step S7 and, when the change rate D1 is judged to exceed the first threshold K1 (V/Ah) at Step S8, the charging of the lithium ion secondary batteries 100 is restricted at Step SA. However, it is also possible to compute a change rate D2 (V/s) of terminal voltage per unit time at Step S7 and, when the change rate D2 is judged to exceed a predetermined second threshold K2 (V/s) at Step S8, it is possible to restrict the charging of the lithium ion secondary batteries 100 at Step SA. Here, in the first embodiment, when the lithium ion secondary batteries 100 are charged with an electric current of 1 C, it is possible to restrict the charging of the lithium ion secondary batteries 100 appropriately by setting the second threshold K2 at 6×10-3 (V/s) for example.

The invention claimed is:

1. A battery pack system comprising:
a battery pack comprising a plurality of lithium ion secondary batteries electrically connected in series to each other, each of the lithium ion secondary batteries including: a positive electrode plate having a positive active material; a positive terminal electrically connected to the positive electrode plate; a negative electrode plate having a negative active material; and a negative terminal electrically connected to the negative electrode plate,
wherein the lithium ion secondary battery has a property of being able to secure a flat charge-discharge capacity range defined as a capacity range that: accounts for 50% or more of an electric capacity range having, as an upper limit, a theoretical electric capacity that can be accumulated theoretically to the maximum in the positive active material; and corresponds to a range in which fluctuation of terminal voltage between the positive terminal and the negative terminal is 0.2 V or lower in both the cases where the battery is charged and discharged with electric current having a current value of 1 C at which the battery can be charged up to the theoretical electric capacity for one hour,
charge-discharge control means for charging and discharging each of the lithium ion secondary batteries in a charge-discharge capacity range including at least a part of a maximum flat charge-discharge capacity range defined as a widest range of the flat charge-discharge capacity range of each lithium ion secondary battery;
current detection means for detecting a value of current flowing in each of the lithium ion secondary batteries;
electric quantity computation means for computing a charged electric quantity or a discharged electric quantity of each of the lithium ion secondary batteries by integrating the detected current value; and
electric capacity estimation means for estimating an electric capacity stored in each lithium ion secondary battery in an electric capacity range including at least a part of the maximum flat charge-discharge capacity range based on the computed charged electric quantity or the computed discharged electric quantity.

2. The battery pack system according to claim 1, wherein a range of 80% or more of the charge-discharge capacity range belongs to the maximum flat charge-discharge capacity range.

3. The battery pack system according to claim 1, wherein the system further comprises voltage detection means for detecting the terminal voltage of one or more of the lithium ion secondary batteries, and the charge-discharge control means is arranged to control charging and discharging of each of the lithium ion secondary batteries based on the detected terminal voltage.

4. The battery pack system according to claim 3, wherein the charge-discharge control means includes charging stop means for stopping the charging of each of the lithium ion secondary batteries when the terminal voltage reaches a charging voltage upper limit.

5. The battery pack system according to claim 4, wherein the positive active material of each of the lithium ion secondary batteries is $LiFe_{(1-X)}M_XPO_4$, wherein M represents at least one of Mn, Cr, Co, Cu, Ni, V, Mo, Ti, Zn, Al, Ga, Mg, B, and Nb, and X is determined by an expression: $0 \leq X \leq 0.5$,
the negative active material is a carbonaceous material, and
the charging voltage upper limit is set at a value of 3.60 V or higher and 4.05 V or lower.

6. The battery pack system according to claim 4, wherein the positive active material of each of the lithium ion secondary batteries is $LiFe_{(1-X)}M_XPO_4$, wherein M represents at least one of Mn, Cr, Co, Cu, Ni, V, Mo, Ti, Zn, Al, Ga, Mg, B, and Nb, and X is determined by an expression: $0 \leq X \leq 0.5$,
the negative active material is a $Li_4Ti_5O_{12}$ type material, and
the charging voltage upper limit is set at a value of 2.1 V or higher and 2.4 V or lower.

7. The battery pack system according to claim 1, further comprising change rate computation means for computing a change rate of the terminal voltage per unit charged electric quantity or a change rate of the terminal voltage per unit time during at least charging of each of the lithium ion secondary batteries,
wherein each lithium ion secondary battery has a property of increasing the change rate of the terminal voltage per unit charged electric quantity and the change rate of the terminal voltage per unit time as the electric capacity comes close to the theoretical electric capacity in an end stage of charging when each lithium ion secondary battery is charged until the electric capacity reaches the theoretical electric capacity,
the charge-discharge control means comprises charging restriction means for restricting charging of each lithium ion secondary battery when:
the change rate of the terminal voltage per unit charged electric quantity computed by the change rate computation means exceeds a first predetermined threshold larger than an average change rate of the terminal voltage per unit charged electric quantity in the maximum flat charge-discharge capacity range, or,
the change rate of the terminal voltage per unit time computed by the change rate computation means exceeds a second predetermined threshold larger than an average change rate of the terminal voltage per unit time in the maximum flat charge-discharge capacity range.

8. The battery pack system according to claim 7, wherein the positive active material of each of the lithium ion secondary batteries is $LiFe_{(1-X)}M_XPO_4$, wherein M represents at least one of Mn, Cr, Co, Cu, Ni, V, Mo, Ti, Zn, Al, Ga, Mg, B, and Nb, and X is determined by an expression: $0 \leq X \leq 0.5$,
the negative active material is a carbonaceous material, and
the charging restriction means sets the first threshold or the second threshold at a value corresponding to the change rate of terminal voltage per an electric capacity corresponding to 1% of the theoretical electric capacity, the change rate falling within a range of $5.0 \times 10^{-3}$ V or more and $2.5 \times 10^{-1}$ V or less.

9. The battery pack system according to claim 7, wherein the positive active material of each of the lithium ion secondary batteries is $LiFe_{(1-X)}M_XPO_4$, wherein M represents at least one of Mn, Cr, Co, Cu, Ni, V, Mo, Ti, Zn, Al, Ga, Mg, B, and Nb, and X is determined by an expression: $0 \leq X \leq 0.5$,
the negative active material is a $Li_4Ti_5O_{12}$ type material, and
the charging restriction means sets the first threshold or the second threshold at a value corresponding to the change rate of terminal voltage per an electric capacity corresponding to 1% of the theoretical electric capacity, the change rate falling within a range of $1.0 \times 10^{-3}$ V or more and $1.5 \times 10^{-1}$ V or less.

10. A battery pack system comprising:
a battery pack comprising a plurality of lithium ion secondary batteries electrically connected in series to each other, each of the lithium ion secondary batteries including: a positive electrode plate having a positive active material; a positive terminal electrically connected to the positive electrode plate; a negative electrode plate having a negative active material; and a negative terminal electrically connected to the negative electrode plate,
wherein the lithium ion secondary battery has a property of being able to secure a flat charge-discharge capacity range defined as a capacity range that: accounts for 50% or more of an electric capacity range having, as an upper limit, a theoretical electric capacity that can be accumulated theoretically to the maximum in the positive active material; and corresponds to a range in which fluctuation of terminal voltage between the positive terminal and the negative terminal is 0.2 V or lower in both the cases where the battery is charged and discharged with electric current having a current value of 1 C at which the battery can be charged up to the theoretical electric capacity for one hour,
charge-discharge control means for charging and discharging each of the lithium ion secondary batteries in a charge-discharge capacity range including at least a part of a maximum flat charge-discharge capacity range defined as a widest range of the flat charge-discharge capacity range of each lithium ion secondary battery;
change rate computation means for computing a change rate of the terminal voltage per unit charged electric quantity or a change rate of the terminal voltage per unit time during at least charging of each of the lithium ion secondary batteries,
wherein each lithium ion secondary battery has a property of increasing the change rate of the terminal voltage per unit charged electric quantity and the change rate of the terminal voltage per unit time as the electric capacity comes close to the theoretical electric capacity in an end stage of charging when each lithium ion secondary battery is charged until the electric capacity reaches the theoretical electric capacity,
the charge-discharge control means comprises charging restriction means for restricting charging of each lithium ion secondary battery when:
the change rate of the terminal voltage per unit charged electric quantity computed by the change rate computation means exceeds a first predetermined threshold larger than an average change rate of the terminal voltage per unit charged electric quantity in the maximum flat charge-discharge capacity range, or, the change rate of the terminal voltage per unit time computed by the change rate computation means exceeds a second predetermined threshold larger than an average change rate of the terminal voltage per unit time in the maximum flat charge-discharge capacity range.

* * * * *